US006427051B1

(12) United States Patent
Hosokawa et al.

(10) Patent No.: US 6,427,051 B1
(45) Date of Patent: Jul. 30, 2002

(54) CONTROLLER FOR CONTROLLING A CAMERA HAVING A BUILT-IN FLASH

(75) Inventors: Tetsuo Hosokawa; Toshihiro Hamamura, both of Tokyo; Shigeru Iwamoto; Tadahisa Ohkura, both of Saitama; Hidefumi Kaneko, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/598,214

(22) Filed: Jun. 21, 2000

(30) Foreign Application Priority Data

Jun. 24, 1999 (JP) ............................................ 11-178422

(51) Int. Cl.[7] .............................................. G03B 15/05
(52) U.S. Cl. ........................ 396/165; 396/166; 396/177; 396/182; 396/201
(58) Field of Search ................................ 396/165, 166, 396/168, 176, 177, 178, 182, 201, 155

(56) References Cited

U.S. PATENT DOCUMENTS

| 4,196,988 A | 4/1980 | Kawasaki ..................... 396/161 |
| 4,959,679 A | 9/1990 | Yamamoto et al. .......... 396/165 |
| 5,122,829 A | 6/1992 | Takami ......................... 396/89 |
| 5,233,378 A | 8/1993 | Hosokawa et al. .......... 396/177 |
| RE35,415 E | 12/1996 | Takami ......................... 396/165 |
| 5,822,628 A | 10/1998 | Sato et al. .................... 396/159 |
| 5,915,133 A | 6/1999 | Hirai et al. ..................... 396/48 |

FOREIGN PATENT DOCUMENTS

| GB | 2237397 | 5/1991 | ............ G03B/15/05 |
| JP | 9-197463 | 7/1997 | ............. G03B/7/00 |

*Primary Examiner*—W. B. Perkey
(74) *Attorney, Agent, or Firm*—Greenblum & Bernstein, P.L.C.

(57) ABSTRACT

A camera includes a built-in flash and a controller for controlling the camera. The controller includes different photographic modes; an auto-exposure-mode selecting mode in which an appropriate photographic mode is automatically selected from the different photographic modes based on photographic conditions, the controller allowing the built-in flash to discharge automatically in the selected appropriate photographic mode when the built-in flash discharges at a most appropriate time of exposure; and a flash-prohibiting/auto-exposure-mode selecting mode in which an appropriate photographic mode is automatically selected from the different photographic modes based on photographic conditions, the controller prohibiting the built-in flash from discharging automatically in the selected appropriate photographic mode at a time of exposure. The controller selects either the auto-exposure-mode selecting mode or the flash-prohibiting/auto-exposure-mode selecting mode in response to an operation of the manual operation member.

25 Claims, 19 Drawing Sheets

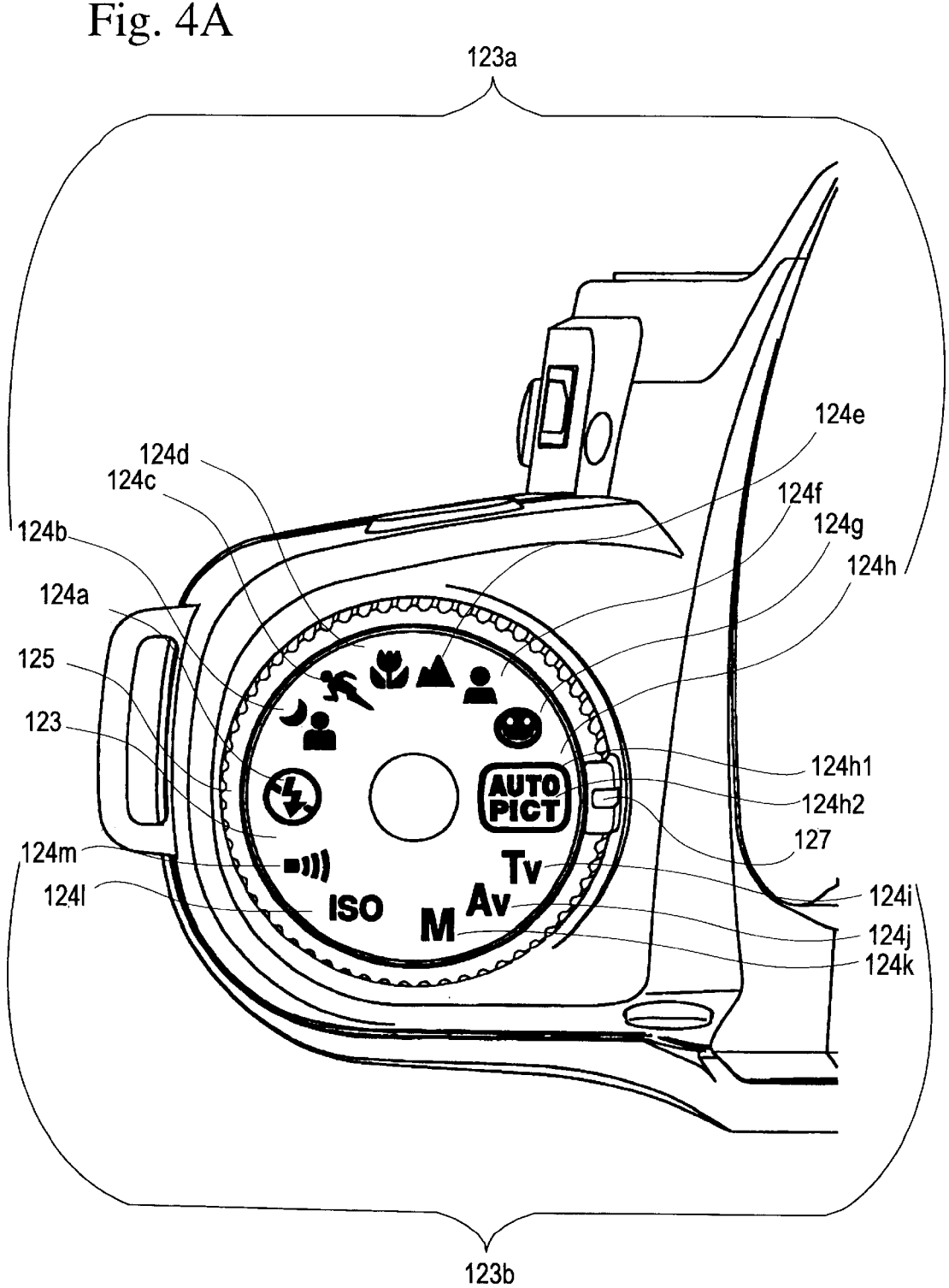

CONTROLLER FOR CONTROLLING A CAMERA HAVING A BUILT-IN FLASH

BACKGROUND OF THE INVENTION

1. Field of the Invention

The present invention relates to a camera having a built-in flash, more particularly, to a controller for controlling a camera having a built-in flash.

2. Description of the Related Art

SLR cameras having a retractable built-in flash and an auto-flash discharge mode in which the built-in flash is controlled to pop-up and discharge automatically in a low-light situation are known in the art.

In such conventional types of SLR cameras, it is sometimes the case that the built-in flash automatically pops up and discharges unexpectedly, resulting in an undesired exposure. This problem can be prevented from occurring if an auto-flash prohibiting mode is manually set by the user. When the user desires to set the auto-flash prohibiting mode or the auto-flash discharge mode, he or she has to operate a mode select button, dial or knob while viewing an information display panel (e.g., an LCD panel) provided on the camera body, after having set a desired exposure mode. This is a troublesome operation.

SUMMARY OF THE INVENTION

An object of the present invention is to provide a controller for controlling a camera having a built-in flash, wherein the controller makes it possible to achieve, by a simple operation, a most appropriate exposure mode which is selected automatically from different exposure modes based on the photographic situation, so that the built-in flash is prohibited from discharging in the appropriate selected exposure mode.

To achieve the object mentioned above, according to an aspect of the present invention, a camera is provided, including a built-in flash, a manual operation member, and a controller for controlling the camera. The controller includes different photographic modes; an auto-exposure-mode selecting mode in which an appropriate photographic mode is automatically selected from the different photographic modes based on photographic conditions, the controller allowing the built-in flash to discharge automatically in the selected appropriate photographic mode when the built-in flash discharges at a most appropriate time of exposure; and a flash-prohibiting/auto-exposure-mode selecting mode in which an appropriate photographic mode is automatically selected from the different photographic modes based on photographic conditions, the controller prohibiting the built-in flash from discharging automatically in the selected appropriate photographic mode at a time of exposure. The controller selects either the auto-exposure-mode selecting mode or the flash-prohibiting/auto-exposure-mode selecting mode in response to an operation of said manual operation member.

Preferably, the manual operation member is an operation dial, wherein the controller includes a function to select a mode from the different photographic modes, the auto-exposure-mode selecting mode and the flash-prohibiting/auto-exposure-mode selecting mode in response to an operation of the mode dial.

In an embodiment, the built-in flash includes a flashlight emitter which is movable between a retracted position and a raised position, wherein the flashlight emitter can discharge at the raised position.

Preferably, the camera further includes an operation member which can be manually operated from outside the camera, and wherein the controller controls the flashlight emitter so as to rise from a retracted position to a discharge position upon an operation of the operation member.

In an embodiment, the controller allows the built-in flash to discharge when the flashlight emitter is in the discharge position.

In an embodiment, the controller controls the flash emitter so as to prohibit the flash emitter from rising from a retracted position to a discharge position when in the flash-prohibiting/auto-exposure-mode selecting mode, even if the operation member is operated.

In an embodiment, the controller prohibits the built-in flash from discharging in the flash-prohibiting/auto-exposure-mode selecting mode even if the flashlight emitter is in the discharge position.

Preferably, an external connector is further provided to which an external flash unit can be connected. The controller prohibits the external flash from discharging in the flash-prohibiting/auto-exposure-mode selecting mode when the external flash unit is connected to the external connector.

In an embodiment, the different photographic modes include at least two exposure modes; wherein the manual operation member can be moved manually to be positioned at one of at least four positions. Each of the at least two exposure modes is selected when the manual operation member is moved manually to be positioned at a corresponding one of the at least four positions which is located between a first position, at which the flash-prohibiting/auto-exposure-mode selecting mode is selected, and a second position, at which the auto-exposure-mode selecting mode is selected.

According to another aspect of the present invention, a controller for controlling a camera, including different photographic modes; a manual operation member; an auto-exposure-mode selecting mode in which an appropriate photographic mode is automatically selected from the different photographic modes based on photographic conditions, the controller allowing a flash light emitter to discharge automatically in the selected appropriate photographic mode when the flash light emitter preferably discharges at a time of exposure; and a flash-prohibiting/auto-exposure-mode selecting mode in which an appropriate photographic mode is automatically selected from the different photographic modes based on photographic conditions, the controller prohibiting the flash light emitter from discharging automatically in the selected appropriate photographic mode at a time of exposure. The controller selects one of the auto-exposure-mode selecting mode and the flash-prohibiting/auto-exposure-mode selecting mode in response to an operation of the manual operation member.

According to another aspect of the present invention, a controller is provided for controlling a camera having an external connector to which an external flash unit can be connected, the controller including different photographic modes; a manual operation member; and a flash-prohibiting/auto-exposure-mode selecting mode in which an appropriate photographic mode is automatically selected from the different photographic modes based on photographic conditions, the controller prohibiting the built-in flash from discharging automatically in the selected appropriate photographic mode at a time of exposure. The controller prohibits the external flash from discharging automatically in the selected appropriate photographic mode at a time of exposure when the external flash unit is connected to the external connector. The controller selects one of the auto-exposure-mode selecting mode and the flash-prohibiting/auto-exposure-mode selecting mode in response to an operation of the manual operation member, the external flash unit being prohibited from discharging in the flash-prohibiting/auto-exposure-mode selecting mode.

In an embodiment, the appropriate photographic mode is automatically selected from the different photographic modes based on a low-light condition in the auto-exposure-mode selecting mode.

In an embodiment, the different photographic modes includes a standard mode and a sports action mode, wherein a faster shutter speed is selected than in the standard mode in order to photograph an object in motion.

Preferably, the different photographic modes further includes a close-up mode, a landscape mode and a portrait mode.

In an embodiment, the different photographic modes include at least two exposure modes. The manual operation member can be moved manually to be positioned at one of at least four positions. Each of the at least two exposure modes is selected when the manual operation member is moved manually to be positioned at a corresponding one of the at least four positions which is located between a first position at which the flash-prohibiting/auto-exposure-mode selecting mode is selected and a second position at which the auto-exposure-mode selecting mode is selected.

According to another aspect of the present invention, a camera having a built-in flash is provided, including different programmed AE modes; an auto-exposure-mode selecting mode in which an appropriate programmed AE mode is automatically selected from the different programmed AE modes based on a photographic condition, the built-in flash being allowed to discharge automatically in the selected appropriate photographic mode when the built-in flash discharges at a most appropriate time of exposure; and a flash-prohibiting/auto-exposure-mode selecting mode in which an appropriate photographic mode is automatically selected from the different programmed AE modes based on a photographic condition, the built-in flash being prohibited from discharging automatically in the selected appropriate photographic mode at a time of exposure.

Preferably a select dial provided on a camera body of the camera is also provided; wherein one mode is selected from the different programmed AE modes, the auto-exposure-mode selecting mode and the flash-prohibiting/auto-exposure-mode selecting mode by an operation of the select dial.

Preferably, the select dial can indicate the automatically selected appropriate photographic mode in each of the auto-exposure-mode selecting mode and the flash-prohibiting/auto-exposure-mode selecting mode by illuminating a character on the select dial which corresponds to the appropriate photographic mode.

The present disclosure relates to subject matter contained in Japanese Patent Application No. 11-178422 (filed on Jun. 24, 1999) which is expressly incorporated herein by reference in its entirety.

BRIEF DESCRIPTION OF THE DRAWINGS

The present invention will be described below in detail with reference to the accompanying drawings in which:

FIG. 4A is a plan view of a fundamental element of the mode dial provided on the camera body shown in FIG. 1;

DESCRIPTION OF THE PREFERRED EMBODIMENTS

Figure 1A:
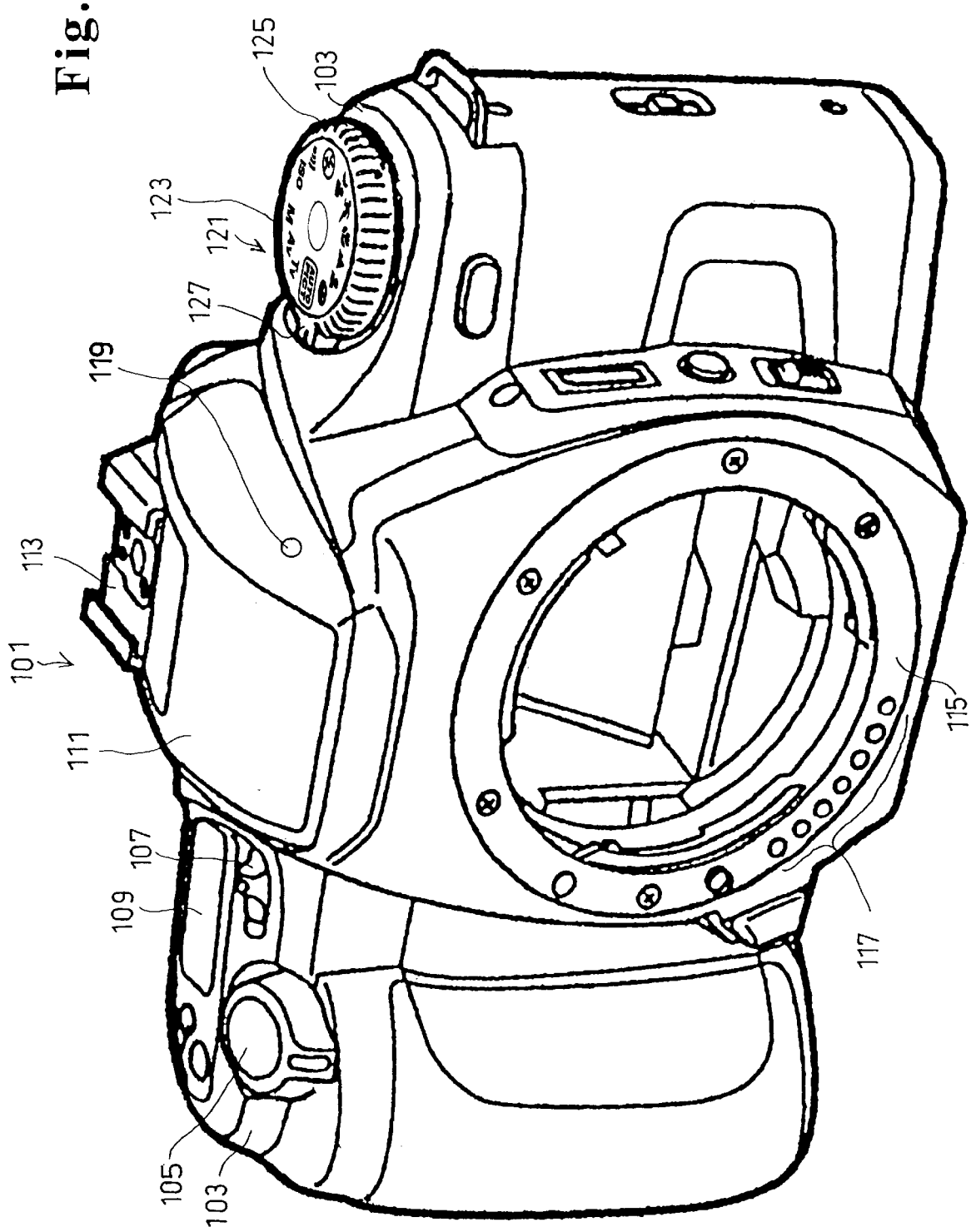
FIG. 1A is a perspective view of an embodiment of a camera body of an SLR camera system, according to the present invention.
Figure 1B:
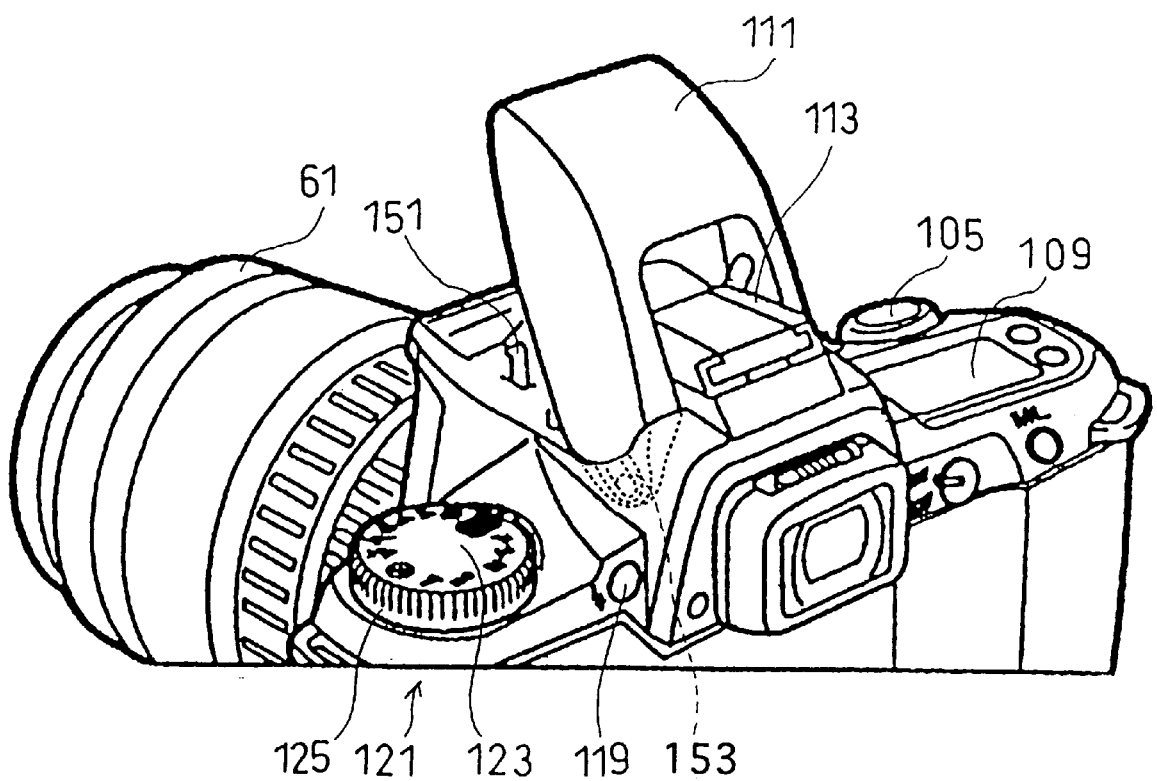
FIG. 1B is a perspective view of part of the SLR camera system shown in FIG. 1A, seen from behind the camera body, in a state where the built-in flash of the camera body has popped up.

FIG. 1 shows an embodiment of a camera body of an AE/AF SLR camera system to which the present invention is applied. The camera body 101 is provided on a top cover 103 thereof with a release button 105, which is positioned on the left side of the top cover 103 as viewed in FIG. 1. The camera body 101 is provided on the top cover 103 behind the release button 105 with a main switch knob 107 and an external LCD panel 109. The external LCD panel 109 indicates various photographic information such as frame number, shutter speed, aperture value and other information. The camera body 101 is provided on the top center thereof with a retractable built-in auto flash 111 which is controlled by a CPU (controller) 11 of the camera body 101 via a built-in flash control circuit 53 (see FIG. 3). The camera body 101 is provided thereon immediately behind the built-in flash 111 with a hot shoe (external connector) 113 to which an external flash can be coupled. Although the details are not herein discussed, the built-in flash 111 is provided therein with a flashlight unit including a reflector, a xenon tube (flashlight emitter) and a Fresnel lens. The flashlight unit is supported and driven by a pop-up mechanism so that the unit can move between a retracted position (shown in FIG. 1) and a pop-up position (discharge position) (see FIG. 1B) where the Fresnel lens faces the object. The pop-up mechanism is provided with a spring 153 which continuously biases the built-in flash 111 towards the pop-up position and a hold mechanism for holding the built-in flash 111 at the retracted position against the spring 153 force of the aforementioned spring when the built-in flash 111 is retracted.

The camera body 101 is provided, on the top cover 103 on the right side thereof as viewed in FIG. 1, with a mode dial (select dial) 121 adapted as a device for manually selecting a desired mode from different modes. The camera body 101 is provided on a front face thereof with an annular body mount 115 to which an interchangeable lens 61 (see FIG. 3) is detachably attached. The camera body 101 is provided on the body mount 115 with an array of contacts 117 which come into contact with a corresponding array of contacts provided on the interchangeable lens 61 so that the CPU 11 can communicate with a lens CPU 63 (see FIG. 3) to input various lens information such as open aperture value and focal length to the CPU 11.

The mode dial 121 is provided with a mode indication disk (indication member) 123 fixed to the top cover 103 and a bezel 125 rotatably fitted around the mode indication disk 123. The mode indication disk 123 is provided thereon circumferentially about a central axis thereof with a plurality of characters (thirteen characters 124a through 124m in this particular embodiment) each representing a corresponding mode. Namely, there are thirteen modes which can be selected by operating the mode dial 121. The bezel 125 is provided with an index mark 127. After the bezel 125 is rotated manually, it always stops by a click-stop mechanism so that the index mark 127 is set to (points at) one of the plurality of characters 124a through 124m. When the index mark 127 is set to one of the thirteen characters 124a through 124m, the corresponding one of the thirteen modes is selected.

The thirteen characters 124a through 124m are classified into two groups: the first group 123a including eight characters 124a through 124h and the second group 123b including the remaining five characters 124i through 124m (refer to FIG. 4A). Portions of the mode indication disk 123 which respectively correspond to the first group of characters 123a are designed to be translucent so that each character in the first group 123a can be illuminated by a corresponding light emitter from the bottom (behind) of the mode indication disk 123 (i.e., from the inside of the camera body 101). None of the characters in the second group 123b are illuminated by a light emitter.

Figure 2:
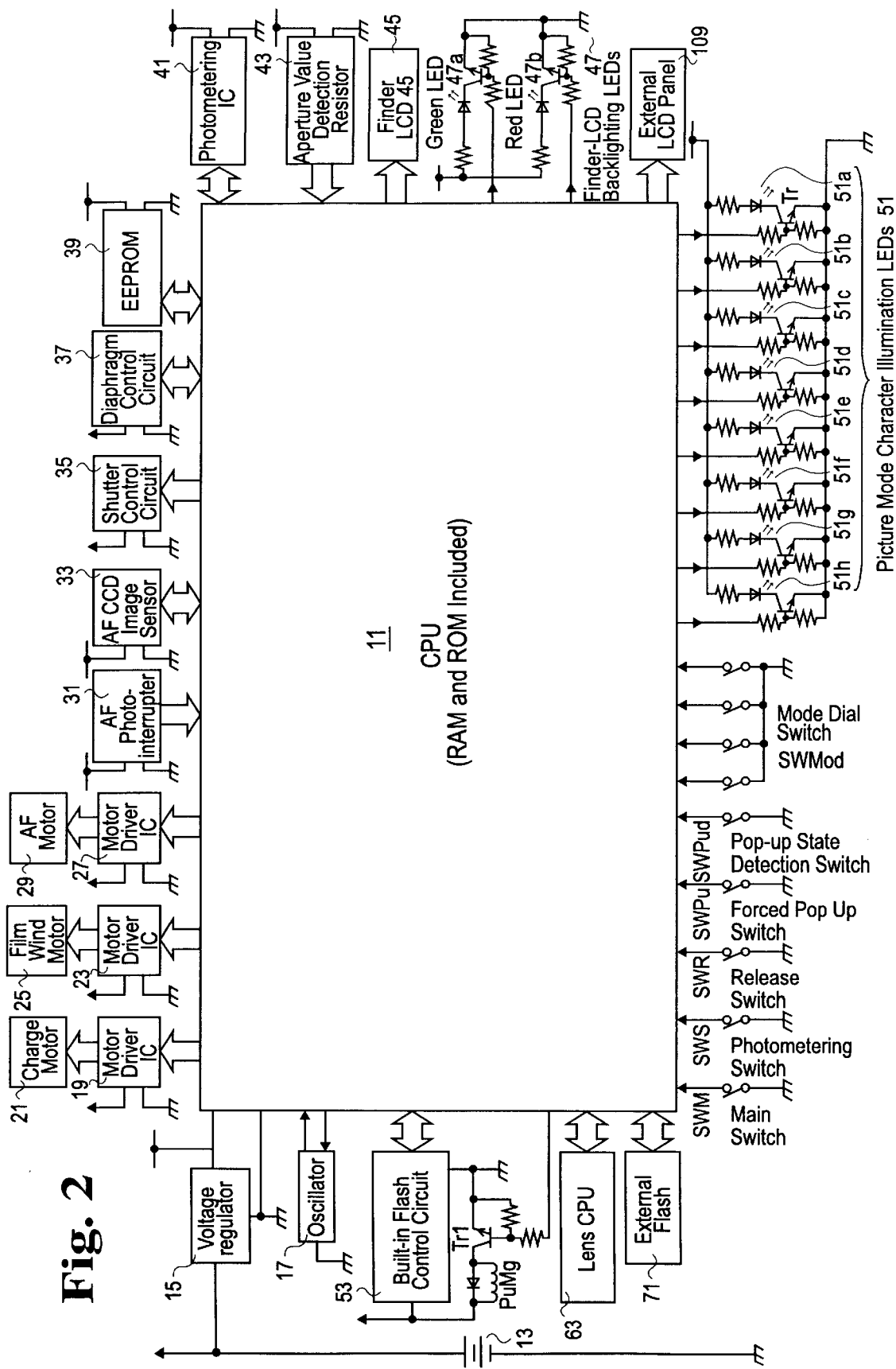
FIG. 2 is a block diagram of an embodiment of a control circuit of the camera body shown in FIG. 1.
Figure 3:
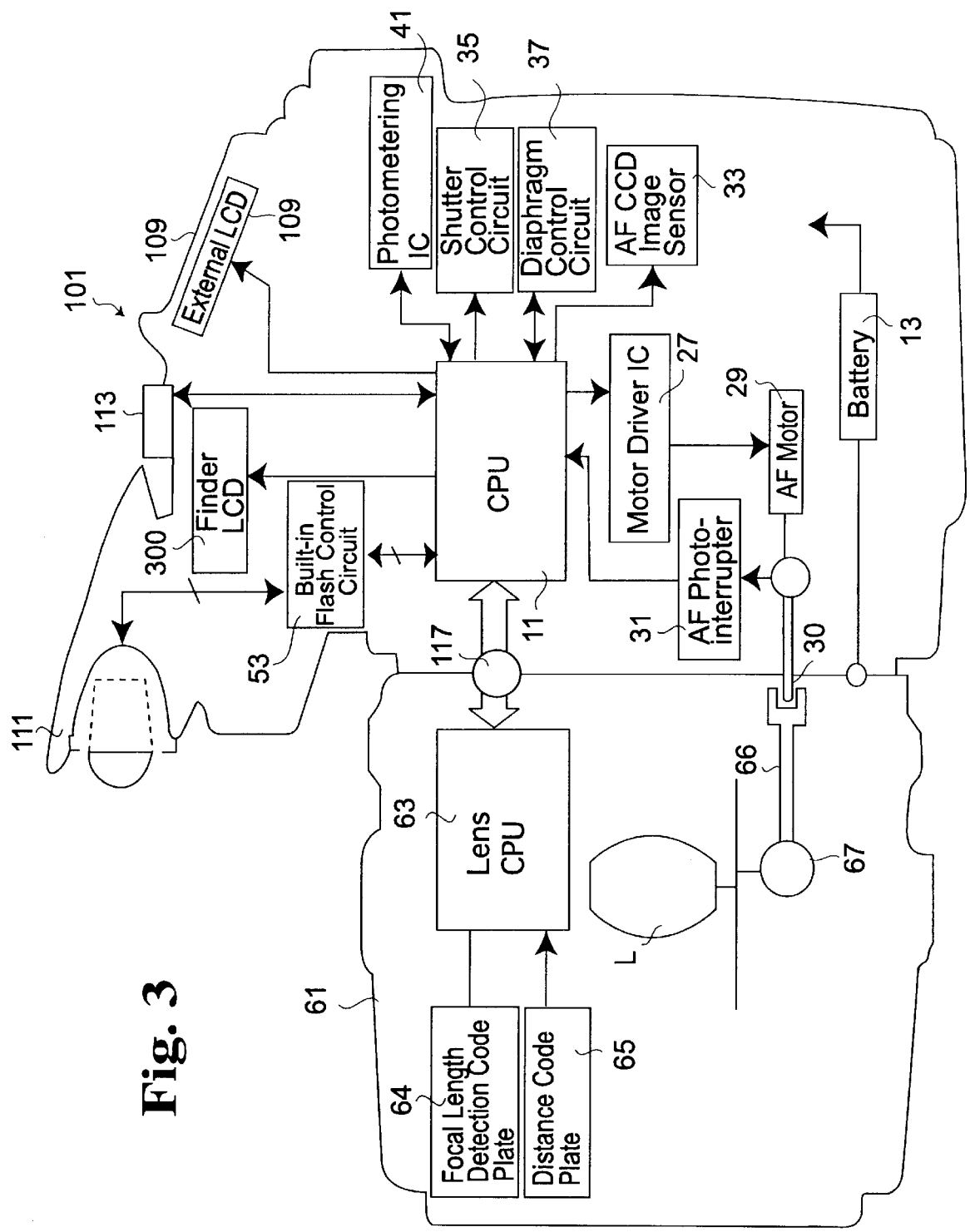
FIG. 3 is a schematic block diagram of fundamental elements of the SLR camera system according to the present invention, showing a state where an interchangeable lens is coupled to the camera body shown in FIG. 1.

Control system of the camera body 101 will be hereinafter discussed in detail with reference to FIGS. 2 and 3. The camera body 101 is provided with the CPU 11 which comprehensively controls the overall operations of the camera system. The CPU 11 is provided therein with a ROM in which control programs regarding various functions of the camera are written and a RAM for temporarily storing information such as various parameters and lens information. As shown in FIG. 2, in addition to the CPU 11, the camera body 101 is provided therein with a voltage regulator 15, an oscillator 17, a first motor driver IC 19, a charge motor 21, a second motor driver IC 23, a film wind motor 25, a third motor driver IC 27, an AF motor 29, an AF photo-interrupter 31, an AF CCD image sensor 33, a shutter control circuit 35, a diaphragm control circuit 37 and an EEPROM 39. The camera body 101 is further provided therein with a photometering IC 41, an aperture value detection resistor 43, a finder LCD 45, a pair of LEDs (green and red LEDs) 47 and eight LEDs (picture mode character illumination LEDs/illumination device) 51 (51a through 51h). The camera body 101 is further provided therein with a main switch SWM, a photometering switch SWS, a release switch SWR, a forced pop-up switch SWPu, a pop-up state detection switch SWPud and a mode dial switch SWMod.

The EEPROM 39, in which information about the number of exposures of a film roll, and various re-writable parameters and modes are written, is connected to the CPU 11. Power of a battery 13 accommodated in a battery chamber (not shown) of the camera body 101 is supplied to the CPU 11 as a constant voltage power via the voltage regulator 15. The CPU 11 supplies the constant voltage power to the oscillator 17 to cause the oscillator 17 to output clock pulses. The CPU 11 operates in synchronism with the clock pulses output from the oscillator 17.

The main switch SWM, the photometering switch SWS, the release switch SWR, the forced pop-up switch SWPu, the pop-up state detection switch SWPud and the mode dial switch SWMod are each connected to the CPU 11. The mode dial switch SWMod is interconnected with the bezel 125.

The main switch SWM is interconnected with the main switch knob 107 so that the main switch SWM is turned ON when the main switch knob 107 is operated. If the main switch SWM is turned ON, the CPU 11 starts operating, so that the CPU 11 supplies power to peripheral elements and at the same time the CPU 11 starts performing various operations which correspond to the ON/OFF states of the switches operated.

The photometering switch SWS and the release switch SWR are interconnected with the release button 105 so that the photometering switch SWS and the release switch SWR are turned ON when the release button 105 is depressed half-way down and fully depressed, respectively. Immediately after the photometering switch SWS is turned ON, the CPU 11 inputs a photometering signal from the photometering IC 41 to calculate the object brightness. Based on this object brightness, the CPU 11 performs an AE calculation process ("AE Calculation Process" shown in FIG. 9) in which the optimum shutter speed and the optimum aperture value in the selected exposure mode are calculated. At the same time the CPU 11 inputs video signals of the object image from the AF CCD image sensor (a phase-difference detection CCD sensor) 33 to calculate the amount of defocus to perform an AF process ("AF Process" shown in FIG. 5B). In the AF process, the CPU 11 drives the AF motor 29 by an amount corresponding to the amount of defocus via the motor driver IC 27 to move a focusing lens group L of the interchangeable lens 61 to an axial position where an in-focus state is obtained. Rotation of the AF motor 29 is transmitted to a joint 66 provided in the interchangeable lens 61 via an AF coupler 30 to drive an focal length adjusting mechanism 67 in the interchangeable lens 61 via the AF coupler 30 and the joint 66 to thereby move the focusing lens group L to an axial position thereof where an in-focus state is obtained. The AF photo-interrupter 31 outputs pulses in association with rotation of the AF motor 29 so that the number of pulses output from the AF photo-interrupter 31 corresponds to the amount of movement of the focusing lens group L. The CPU 11 inputs pulses output from the AF photo-interrupter 31 to control the amount of driving of the AF motor 29 in accordance with the inputs pulses. The photometering IC 41 is provided with a multi-segment photometering sensor, so that the camera measures and compares photometric readings in segmented areas of the photographic field.

Immediately after the release switch SWR is turned ON, the CPU 11 drives a quick-return mirror 160 (see FIG. 1) to rise, controls the diaphragm control circuit 37 to stop down the iris diaphragm of the interchangeable lens 61 in accordance with the aperture value determined by the AE calculation process and subsequently controls the shutter circuit 35 to release the shutter (focal plane shutter) in accordance with the determined shutter speed. Upon the completion of exposure, the CPU 11 drives the charge motor 21 via the motor driver IC 19 to make the quick-return mirror 160 fall back and to charge the shutter mechanism, i.e., charge the drive springs of the leading and trailing curtains of the shutter mechanism. Subsequently the CPU 11 drives the film wind motor 25 via the motor driver IC 23 to wind film by one frame.

The forced pop-up switch SWPu is interconnected with a forced pop-up button (operation member) 119 provided on the camera body 101 in the vicinity of the built-in flash 111. Immediately after the forced pop-up switch SWPu is turned ON, i.e., the forced pop-up button 119 is depressed, the CPU 11 turns a switching transistor Tr1 (shown in FIG. 2) ON to supply power to a pop-up magnet PuMg (shown in FIG. 2) to thereby release the engagement of the hold mechanism with the built-in flash 111 held at the retracted positioned thereof by the hold mechanism. Upon the release of the engagement of the hold mechanism with the built-in flash 111, the built-in flash 111 pops up by the aforementioned spring of the pop-up mechanism to be positioned at discharge position. The CPU 11 detects that the built-in flash 111 has popped up to the discharge position via the pop-up state detection switch SWPud, which is turned ON when the built-in flash 111 rises to the discharge position. The pop-up state detection switch SWPud is turned OFF when the built-in flash 111 moves from the discharge position towards the retracted position.

If the CPU 11 detects low-light and/or backlight conditions in accordance with data such as object brightness data obtained from the photometering IC 41 and ISO speed data, the CPU 11 supplies power to the pop-up magnet PuMg to make the built-in flash 111 pop-up so as to make it discharge automatically. When an external flash 71 (see FIG. 2) is attached to the hot shoe 113, the CPU 11 prohibits the built-in flash 111 from popping up to prevent the built-in flash 111 from bumping against the external flash 71 when the CPU 11 controls the external flash 71 instead of the built-in flash 111.

The mode dial switch SWMod is a four-bit code switch which is turned ON and OFF in accordance with the rotational stop position (click-stop position) of the bezel 125. The CPU 11 selects one of the thirteen modes, functions or parameters which corresponds to one of the thirteen characters 124a, 124b, 124c, 124d, 124e, 125f, 125g, 125h, 125i, 125j, 125k, 125l or 125m which the index mark 127 is set to, i.e., which corresponds to the click-stop position of the bezel 125.

The finder LCD 45, which is positioned to be seen in the viewfinder, and the external LCD panel 109 are connected to the CPU 11. Each of the finder LCD 45 and the external LCD panel 109 indicates various photographic information such as frame number, shutter speed, aperture value and other information. In a state where the main switch SWM is OFF, nothing is indicated on the finder LCD 45 while information necessary prior to picture taking is indicated on the external LCD panel 109. Such information includes, e.g., film status information (loaded/advance/rewind), film counter indication if film is properly loaded, and rewind completion state. In a state where the main switch SWM is ON, in addition to the film counter indication, the currently selected shutter speed/mode and other information are indicated on the external LCD panel 109, whereas nothing is indicated on the finder LCD 45 yet until the AE calculation process starts to be performed by an operation of the mode dial 121. After the AE calculation process is performed, the calculated optimum shutter speed, aperture value and other useful information are indicated on each of the finder LCD 45 and the external LCD panel 109.

Two LEDs 47 (a green LED 47a and a red LED 47b) illuminate information indicated on the finder LCD 45. The CPU 11 turns the green LED 47a ON in a normal photographic condition, while the CPU 11 turns the red LED 47b ON in a warning condition (e.g., when the selected shutter speed is slower than a slowest shutter speed calculated to prevent blurred images due to hand movement) to illuminate the finder LCD 45 by red light so as to warn the user that a desired photographic image will not be obtained.

Eight transistors Tr for driving the eight LEDs (picture mode character illumination LEDs 51a through 51h) 51 independently of one another which illuminate the eight characters 124a through 124h of the first group 123a on the mode indication disk 123, respectively, are connected to the CPU 11. In the illustrated embodiment, when the main switch SWM is turned ON or when one of the program modes represented by the corresponding one of the first group of characters 123a (124a through 124h) is selected by an operation of the bezel 125, the corresponding one of the eight LEDs 51a, 51b, 51c, 51d, 51e, 51f, 51g and 51h is turned ON to illuminate the corresponding character 124a, 124b, 124c, 124d, 124e, 124f, 124g or 125h by turning the corresponding transistor Tr ON in a corresponding predetermined manner.

In a state where the interchangeable lens 61 having the lens CPU 63 is coupled to the camera body 101, the CPU 11 data-communicates with the lens CPU 63 to input various lens information such as the focal length (the current focal length if the lens 61 is of a zoom lens), the object distance (the position of the focal lens group L) and the open aperture value. The lens CPU 63 detects the focal length via a focal length detection code plate 64 (see FIG. 3) and further detects the object distance (the position of the focal lens group L) via a distance code plate 65 to send the detected focal length and the detected object distance to the CPU 11 of the camera body 101.

[Structure of Mode Dial 121]

Figure 4B:
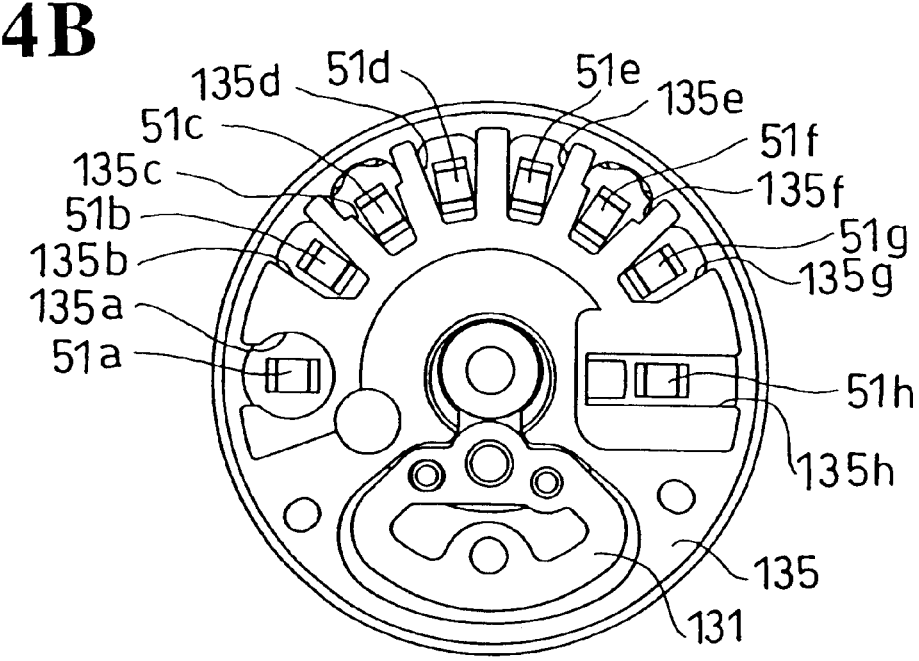
FIG. 4B is a plan view of another fundamental element of the mode dial provided on the camera body shown in FIG. 1.

The structure of the mode dial 121 will be hereinafter discussed in detail with reference to FIGS. 4A and 4B. FIGS. 4A and 4B are plan views of fundamental elements of the mode dial 121.

The mode indication disk 123 is provided thereon with the first group of characters 123a (eight characters or icons 124a through 124h) which are illuminated from the bottom of the mode indication disk 123, and the second group of characters 123b (five characters or icons 124i through 124m) which are not illuminated. The illuminated first group of characters 123a and the non-illuminated second group of characters 123b are formed at predetermined intervals on the mode indication disk 123 along a circle about the central axis thereof. The mode indication disk 123 is made of, e.g., a milky translucent synthetic resin. The first group of characters 123a are formed on the mode indication disk 123 by firstly coating the upper surface of the mode indication disk 123 with black paint, and secondly, by removing portions of the black paint coating, coated on each surface of the first group of characters 123a, by laser. On the other hand, the second group of characters 123b are formed on the black paint coating of the mode indication disk 123 in a manner such that the surfaces on the mode indication disk 123 on which the second group of characters 123b are to be formed are coated with opaque paint of a color other than the black color of the first group of characters 123a. In the illustrated embodiment, the eight characters 124a through 124h, whose portions of the mode indication disk 123 are formed to allow light to pass therethrough, represent eight different program modes, respectively, while the five characters 124i through 124m, whose portions of the mode indication disk 123 are formed not to allow light to pass therethrough, represent a shutter-priority AE mode, an aperture-priority AE mode, a manual mode, an ISO film speed selecting mode and an audible signal ON/OFF selecting mode, respectively. Regarding the first group of characters 123a (124a through 124h), the characters 124a and 124h represent a flash-prohibiting auto picture mode (flash-prohibiting auto select picture mode or flash-prohibiting/auto-exposure-mode selecting mode) and an auto picture mode (auto select picture mode or auto-exposure-mode selecting mode), respectively, while the characters 124b, 124c, 124d, 124e, 124f and 124g represent a night portrait mode, a sports action mode, a close-up mode, a landscape mode, a portrait mode and a standard mode, respectively. The character 124h includes translucent letters "AUTO PICT" 124h1, an abbreviation of the auto picture mode and a substantially rectangular frame 124h2 which is printed on the mode indication disk 123 to surround the translucent letters 124h1.

When the index mark 127 is set to the character 124h, the aforementioned auto picture mode is selected. In the auto picture mode, the CPU 11 performs a predetermined calculation in accordance with the lens data input from the lens CPU 63 to select the most appropriate programmed exposure mode from five different programs (i.e., five picture modes: the sports action mode, the close-up mode, the landscape mode, the portrait mode and the standard mode) automatically. In the most appropriate programmed exposure mode selected in the auto picture mode, the CPU 11 controls the built-in flash 111 to automatically discharge in a low-light condition. The flash-prohibiting auto picture mode is identical to the auto picture mode except that the built-in flash 111 is prohibited from discharging, and hence is prohibited from popping up in the flash-prohibiting auto picture mode.

In addition to the mode indication disk 123, the mode dial 121 is further provided with an LED disk 135 (see FIG. 4B). The LED disk 135 carries the picture mode character illumination LEDs 51a through 51h. The mode indication disk 123 is fixedly mounted on the LED disk 135. The picture mode character illumination LEDs 51a through 51h are arranged on the LED disk 135 to illuminate the characters 124a through 124h, respectively. The LEDs 51a through 51h are fixed to a flexible PWB 137. The LED disk 135 is provided on an upper face thereof with eight pits 135a through 135h which face the eight characters 124a through 124h so that the eight LEDs 51a through 51h are positioned in the eight pits 135a through 135h therein, respectively. The flexible PWB 137 is fixed to a bottom surface of the LED disk 135. Lead wire portions of the flexible PWB 137 extend within the camera body 101 to be connected with the CPU 11.

The bezel 125 is provided with a click-stop mechanism so that the index mark 127 reliably stops at one of the plurality of characters 124a through 124m. The mode dial switch SWMod is designed to be associated with the bezel 125 to output signals each discriminating the corresponding one of a plurality of different program modes (which includes the programmed exposure modes which respectively correspond to the characters 124a through 124h), so that one of the thirteen characters 124a through 124m which the index mark 127 is set opposite is selected thereby.

In the illustrated embodiment, although the bezel 125, which is adapted as an operation member, rotates around the mode indication disk 123 adapted as a mode indication member which indicates the thirteen characters 124a through 124m, the thirteen characters 124a through 124m can be formed outside the bezel 125, not inside the bezel 125 on the mode indication disk 123, so that the thirteen characters 124a through 124m surround the outer periphery of the bezel 125. For instance, the mode indication member can be formed as a stationary ring member which surrounds the bezel 125.

The first group of characters 123a (124a through 124h) can be respectively printed directly on the light exit surfaces of the mode character illumination LEDs 51a through 51h. In this case, for instance, the LEDs 51a through 51h can be mounted on the mode indication disk 123 at predetermined intervals along a circle about the axial center of the mode indication disk 123.

As shown in FIG. 4A, the mode indication disk 123 is designed and positioned relative to the camera body 101 so that the character 124h (which represents the auto picture mode) is positioned closest to the top center of the camera body 101 (i.e., closest to the built-in flash 111) than the other characters formed on the mode indication disk 123 and that the character 124a (which represents the flash-prohibiting auto picture mode) is positioned closest to the top left end of the camera body 101 (i.e., furthest from the top center of the camera body 101) than the other characters formed on the mode indication disk 123.

In the present embodiment, it is assumed that the auto picture mode, which is represented by the character 124h, is used more often than the other modes. Based on this assumption, the eight characters 124a through 124h (the first group of characters 123a) are arranged on the mode indication disk 123 in order of expected frequency of use from the character 124h in a counterclockwise direction as viewed in FIG. 4A. Since it is assumed that the flash-prohibiting auto picture mode is used less often than the other modes, the character 124a, which represents the flash-prohibiting auto picture mode, is positioned farthest from the position of the character 124h representing the auto picture mode. Therefore, when the flash-prohibiting auto picture mode is selected, the bezel 125 needs to be turned by a large amount (i.e., by a large angle of rotation). In a similar manner, the characters 124m and 124l, which respectively represent the audible signal ON/OFF selecting mode and the ISO film speed selecting mode, are arranged on the mode indication disk 123 at positions far from the position of the character 124h since it is assumed that the audible signal ON/OFF selecting mode and the ISO film speed selecting mode are used less often than the other modes among the second group of modes 123b.

Accordingly, the mode indication disk 123 is designed and positioned relative to the camera body 101 so that the character 124a (which represents the flash-prohibiting auto picture mode and is used less often than the other modes) is positioned farther from the character 124h (which represents the auto picture mode and is used more often than the other modes) than the other characters formed on the mode indication disk 123. This arrangement makes it possible for the user to select a desired mode quickly by operating the mode dial 121 by a small amount. Moreover, such arrangement reduces the possibility of selecting the flash-prohibiting auto picture mode by mistake.

Furthermore, when changing the auto picture mode to the flash-prohibiting auto picture mode, the user has only to rotate a single operation member (i.e., the bezel 125, which is used to select a desired exposure mode) manually by a single action, which makes it possible for the user to select the flash-prohibiting auto picture mode quickly with less possibility of selecting other mode by mistake.

Each of the mode character illumination LEDs 51*a* through 51*h* can be in the form of another light emitting element.

Operations of the SLR camera system (the camera body 101) provided with the mode dial 121 will be hereinafter discussed in detail with reference to flow charts shown in FIGS. 5A through 14. The processes represented by the flow charts shown in FIGS. 5A through 14 are performed by the CPU 11 in accordance with the programs written in the internal ROM of the CPU 11.

[Main Process]

A main process ("MAIN" shown in FIGS. 5A and 5B) is performed with the battery 13 loaded in the camera body 101. Immediately after the battery cover (not shown) of the camera body 101 is closed with the battery 13 loaded therein, a CPU initializing process is performed in which each of input and output ports and the internal RAM of the CPU 11 are initialized (step S11). Subsequently, peripheral circuits connected to the input and output ports are also initialized (step S13). Subsequently, a reference timer in the CPU 11 is started (step S15). The operations at steps S11, S13 and S15 are performed immediately after the battery cover is closed with the battery 13 loaded in the camera body 101, and thereafter operations at and after step S17 are repeatedly performed with the battery 13 loaded.

A 250 ms interval timer in the CPU 11 is started (step S17), an ON/OFF state of each switch is input in the CPU 11 (step S19), and it is determined whether the main switch SWM is ON (step S21). The 250 ms interval timer is adapted to set intervals at which the CPU 11 periodically check if the main switch SWM is ON.

If it is determined at step S21 that the main switch SWM is OFF, control proceeds to step S23 at which an external LCD indication process is performed in which the external LCD 109 is controlled to indicate a character or characters which informs the user that the power is currently OFF. Subsequently, the LEDs 51*a* through 51*h* are turned OFF (step S25). Subsequently, it is determined whether 250 ms has elapsed since the 250 ms interval timer started (step S27). If it is determined at step S27 that 250 ms has elapsed, control returns to step S17 at which the 250 ms interval timer is started and the operations from step S19 to step S27 are performed again. The aforementioned operations from step S17 to step S27 are repeatedly performed during the time the main switch SWM is OFF(①  Photometering OFF Loop).

If it is determined at step S21 that the main switch SWM is turned ON, control proceeds to step S29 at which it is determined if the main switch SWM was previously OFF. If it is determined at step S29 that the main switch SWM was previously OFF, it means that control has entered the operation at step S29 for the first time since the main switch SWM was turned ON, therefore, control proceeds to step S31 at which an opening indication process is performed. In the opening indication process, each of the eight LEDs 51*a* through 51*h* is firstly turned ON and subsequently turned OFF in accordance with a predetermined algorithm, and only one of the eight LEDs 51*a* through 51*h* which corresponds to one of the eight program modes (the flash-prohibiting auto picture mode, the night portrait mode, the sports action mode, the close-up mode, the landscape mode, the portrait mode, the standard mode, and the auto picture mode) selected last by the bezel 125 is turned ON at the end.

If it is determined at step S29 that the main switch SWM was not previously OFF, control skips step S31 to proceed to step S33.

A built-in flash pop-up process ("Built-in Flash Pop-up Process" described in FIG. 6) is performed at step S33. In the built-in flash pop-up process, if it is determined that the forced pop-up switch SWPu is ON, the switching transistor Tr1 is turned ON to supply power to the pop-up magnet PuMg to make the built-in flash 111 pop-up. Details of the built-in flash pop-up process will be discussed later.

It is determined at step S35 whether the pop-up state detection switch SWPud is ON, i.e., whether the built-in flash 111 has popped up. If it is determined at step S35 that the pop-up state detection switch SWPud is ON, control proceeds to step S37 at which a built-in flash charging process is performed. If it is determined at step S35 that the pop-up state detection switch SWPud is OFF, control skips step S37 to proceed to step S39.

An LCD indication process is performed at step S39. In this LCD indication process in a power ON state of the camera body 101, useful information such as the currently-selected shutter speed is indicated on the external LCD panel 109, while nothing is indicated on the finder LCD 45 until the AE calculation process starts to be performed by an operation of the mode dial 121.

It is determined at step S41 whether the photometering switch SWS is turned ON. It is determined at step S43 whether the release switch SWR is turned ON. If neither the photometering switch SWS nor the release switch SWR are turned ON, it is determined at step S45 whether a state of the mode dial switch SWMod has changed. If it is determined at step S45 that the state of the mode dial switch SWMod has not changed, control returns to step S27.

Control proceeds to step S49 if it is determined at step S41 that the photometering switch SWS is turned ON, if it is determined at step S43 that the release switch SWR is turned ON, or if it is determined at step S45 that the state of the mode dial switch SWMod has changed.

Figure 5A:
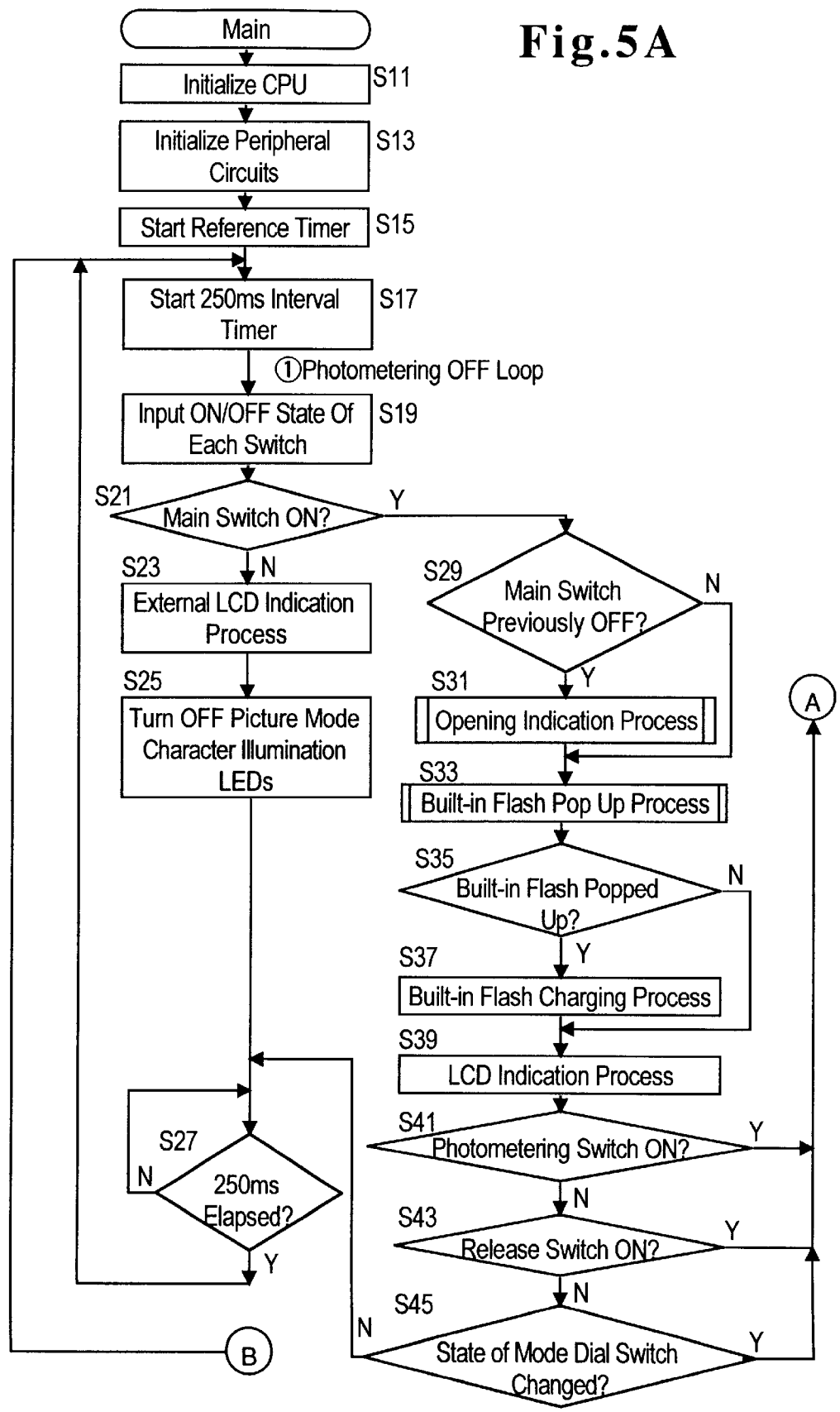
FIGS. 5A and 5B show a flow chart of an embodiment of a main process regarding fundamental operations of the SLR camera system shown in FIG. 3.
Figure 5B:
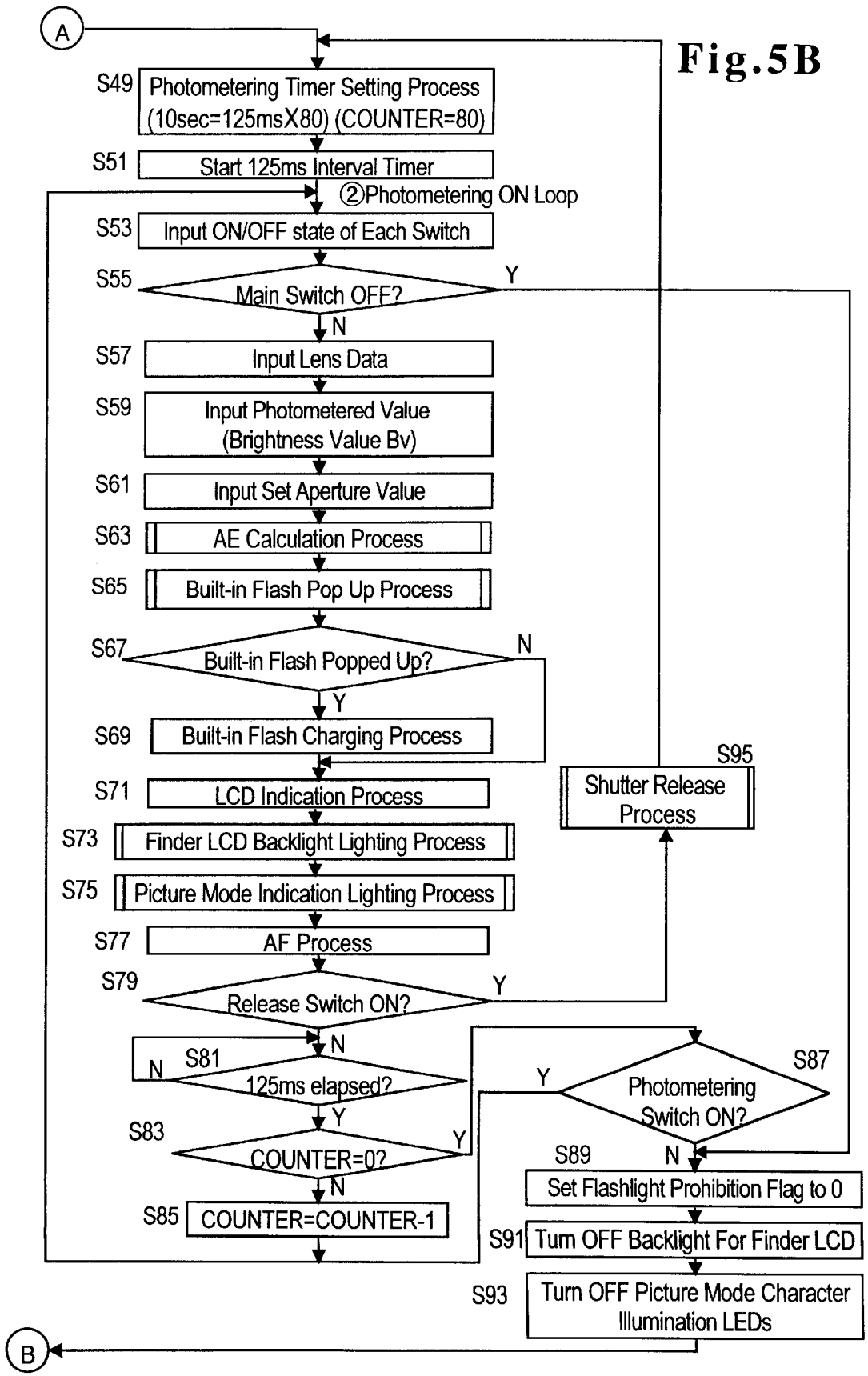

A photometering timer setting process is performed at step S49 (FIG. 5B). In the photometering timer setting process, the number of times of performing a switch check process from step S53 to step S87 is set to a predetermined number of times. Following the photometering timer setting process, the CPU 11 waits for the release switch SWR to be turned ON while performing the switch check process at intervals shorter than the intervals of the 250 ms interval timer. Further, in the case where the release switch SWR is not yet turned ON even if the switch check process has performed the aforementioned predetermined number of times at step S51, control returns to step S17. In the present embodiment, the interval timer used in the photometering timer setting process is an 125 ms interval timer (photometering timer), and the number of times of performing the switch check process is set to 80 to be registered in a counter (COUNTER).

At step S57 the lens data including the F-number at open aperture, the current focal length, and the information on flashlight interruption of the built-in flash 111 by the attached lens are input to the CPU 11. Subsequently, the photometered value (brightness value Bv) is input to the CPU 11 from the photometering IC 41 (step S59), and the set aperture value is input (step S61). The set aperture value, which is set by manually rotating an aperture setting ring (not shown) of the photographic lens 61, is detected from the resistance value of an aperture value detection resistor 43. In the case where the aperture setting ring is set to setting "A" (auto), the CPU 11 does not use the information on the resistance value of the aperture value detection resistor 43 but calculates the aperture value Av in the AE calculation process which is performed at step S63.

After the photometering timer setting process is performed at step S49, the 125 ms interval timer is started (step S51). Thereafter, an ON/OFF state of each switch is input in the CPU 11 (step S53) and subsequently it is determined whether the main switch SWM is OFF (step S55). If it is determined at step S55 that the main switch SWM is OFF, control proceeds to step S89 at which a flashlight prohibition flag for prohibiting the built-in flash 111 from discharging is set to 0. Subsequently, a backlight for the finder LCD 45 is turned OFF (step S91), the LEDs 51a through 51h are turned OFF (step S93), and control returns to step S17. If it is determined at step S55 that the main switch SWM is ON, control proceeds to step S57.

The shutter speed or time value Tv and the aperture value Av are calculated in the AE calculation process ("AE Calculation Process" described in FIG. 9) at step S63. In the AE calculation process, the optimum shutter speed Tv and the optimum aperture value Av are calculated based on the photometered value, the film speed and the exposure compensation value, in accordance with a predetermined algorithm which corresponds to the selected exposure mode. Details on the AE calculation process will be discussed later.

After the AE calculation process is performed, the built-in flash pop-up process ("Built-in Flash Pop-up Process" described in FIG. 6) is performed in accordance with the set shutter speed Tv and the set aperture value Av (step S65). In the built-in flash pop-up process, it is determined whether the built-in flash 111 needs to pop-up, and power is supplied to the pop-up magnet PuMg to make the built-in flash 111 pop-up if it is determined that the built-in flash 111 needs to pop-up. Details of the built-in flash pop-up process will be discussed later. After the built-in flash pop-up process is performed at step S65, it is determined whether the built-in flash 111 has popped up (step S67). If it is determined that the built-in flash 111 has popped up, control proceeds to step S69 at which the built-in flash charging process is performed and thereafter control proceeds to step S71. If it is determined that the built-in flash 111 has not yet popped up, control skips step S69 to proceed to step S71.

An LCD indication process is performed at step S71. In this LCD indication process, various useful information such as the set shutter speed is indicated on the external LCD panel 109, while various useful information such as a current focus state, the set shutter speed, a hand-shake warning indication and flash discharge mode are indicated on the finder LCD 45 while the user is viewing an object through the finder.

Thereafter, a finder LCD backlight lighting process is performed at step S73. Inthe finder LCD backlight lighting process, the green LED 47a is turned ON in a normal photographic condition, while the red LED 47b is turned ON in a warning condition (e.g., when the selected shutter speed is slower than the slowest shutter speed calculated to prevent blurred images due to hand movement).

After the finder LCD backlight lighting process is performed at step S73, a picture mode indication lighting process ("Picture Mode Indication Lighting Process" shown in FIGS. 12A and 12B) is performed at step S75. In the picture mode indication lighting process, in the case where the auto picture mode or the flash-prohibiting auto picture mode is selected, one of the LEDs 51a through 51h which corresponds to the programmed exposure mode which has been selected in the AE calculation process at step S63 is turned ON. Details of the picture mode indication lighting process will be discussed later.

After the picture mode indication lighting process is performed at step S75, the AF process is performed at step S77. In the AF process, the AF CCD image sensor 33 is driven, video signals of object images are input to the CPU 11, and the AF motor 29 is driven by an amount corresponding to the amount of defocus to move the focusing lens group L of the interchangeable lens 61 to an axial position where an in-focus state is obtained.

Subsequently, it is determined whether the release switch SWR is turned ON (step S79). Control returns to step S49 upon performing a shutter release process (S95) if it is determined at step S79 that the release switch SWR is turned ON. If it is determined at step S79 that the release switch SWR is not turned ON, it is determined at step S81 whether 125 ms has elapsed (i.e., whether the 125 ms interval timer is up). If it is determined at step S81 that 125 ms has not yet elapsed, the operation at step S81 is repeatedly performed to wait for the 125 ms interval timer to elapse. If it is determined at step S81 that 125 ms has elapsed, it is determined whether the counter value is zero (step S83). If it is determined that the counter value is not zero, the counter value is decreased by one (step S85) and control returns to step S53. Accordingly, during the time the main switch SWM is ON while the release switch SWR is OFF, the operations from step S53 through step S85 are repeatedly performed eighty times until the counter value, whose initial value is 80, becomes zero. Note that 10 seconds (125 ms80=10 sec) elapses if the operations from step S53 through step S85 are repeatedly performed eighty times.

If it is determined at step S83 that the counter value is zero, control proceeds to step S87 at which it is determined whether the photometering switch SWS is turned ON. If it is determined the photometering switch SWS is turned ON, control returns to step S53. Namely, even if ten seconds elapses, the operations at step S53 through step S83 and step S87 are repeatedly performed as long as the photometering switch SWS is ON (②Photometering ON Loop). If it is determined at step S87 that the photometering switch SWS is not ON, control proceeds to step S89 at which the flashlight prohibition flag is set to 0. Subsequently, the backlight for the finder LCD 45 is turned OFF (step S91), the LEDs 51a through 51h are turned OFF (step S93), and control returns to step S17. At step S91, the CPU 11 turns OFF one of the LEDs 51a through 51h which corresponds to the programmed exposure mode selected in the AE calculation process at step S63 and which is turned ON in the picture mode indication lighting process at step S75 in the case where the auto picture mode or the flash-prohibiting auto picture mode is selected.

[Built-in Flash Pop-up Process]

Figure 6:
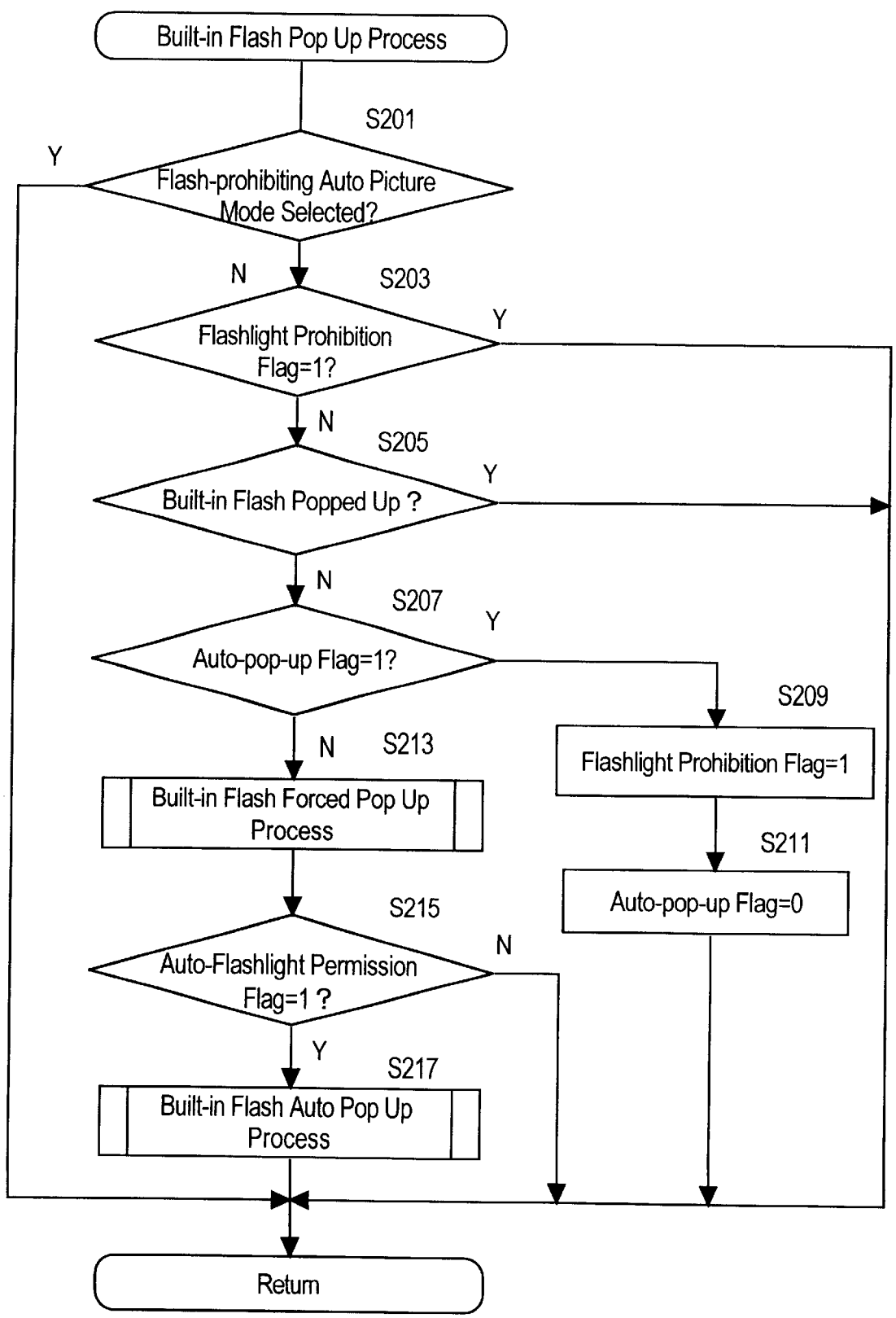
FIG. 6 is a flow chart of the subroutine "Built-in Flash Pop-up Process" shown in FIG. 5.

The built-in flash pop-up process, which is performed at step S33 or S65 in the main process shown in FIGS. 5A and 5B, will be hereinafter discussed in detail with reference to the flowchart shown in FIG. 6. In this process, the switching transistor Tr1 is turned ON to supply power to the pop-up magnet PuMg to make the built-in flash 111 pop-up on condition that any mode other than the flash-prohibiting auto picture mode is selected and that conditions necessary for having the built-in flash 111 discharge are all set. Furthermore, if the built-in flash 111 is forcibly retracted (e.g., manually by the user) after the built-in flash 111 is popped up, the built-in flash 111 is prohibited from popping up automatically until the photometering timer, which is started at step S51, has elapsed.

In the built-in flash pop-up process, firstly it is determined whether the flash-prohibiting auto picture mode has been selected (step S201). If the flash-prohibiting auto picture mode has been selected, the built-in flash 111 is prohibited from discharging, so that control returns.

If it is determined at step S201 that the flash-prohibiting auto picture mode is not selected (i.e., a mode other than the flash-prohibiting auto picture mode is selected), it is determined whether the flashlight prohibition flag is 1 (step S203). If the flashlight prohibition flag is not 1, it is determined whether the built-in flash 111 has popped up (step S205). The default of the flashlight prohibition flag is set to zero. If it is determined at step S203 that the flashlight prohibition flag is 1 or it is determined at step 205 that the built-in flash 111 has popped up, control returns to the main process. If it is determined at step 205 that the built-in flash 111 has not popped up, it is determined whether an auto-pop-up flag is 1 (step S207). The auto-pop-up flag indicates whether the built-in flash 111 has automatically popped up. The default of the auto-pop-up flag is set to zero. The auto-pop-up flag is set to 1 at step S251 shown in FIG. 8.

If it is determined at step S207 that the auto-pop-up flag is zero, a built-in flash forced pop-up process ("Built-in Flash Forced Pop-up Process" described in FIG. 7) is performed (step S213). Subsequently, it is determined whether an auto-flashlight permission flag is 1 (step S215). If it is determined at step S215 that the auto-flashlight permission flag is 1, a built-in flash auto pop-up process ("Built-in Flash Auto Pop-up Process" described in FIG. 8) is performed (step S217) and subsequently control returns to the main process. If it is determined at step S215 that the auto-flashlight permission flag is not 1, control returns to the main process. The auto-flashlight permission flag indicates whether the built-in flash 111 is permitted to discharge automatically. The default of the auto-flashlight permission flag is set to zero. If it is determined at step S207 that the auto-pop-up flag is 1, control proceeds to step S209 at which the flashlight prohibition flag is set to 1. Subsequently, the auto-pop-up flag is set to 0 (step S211), and control returns to the main process.

[Built-in Flash Forced Pop-up Process]

Figure 7:
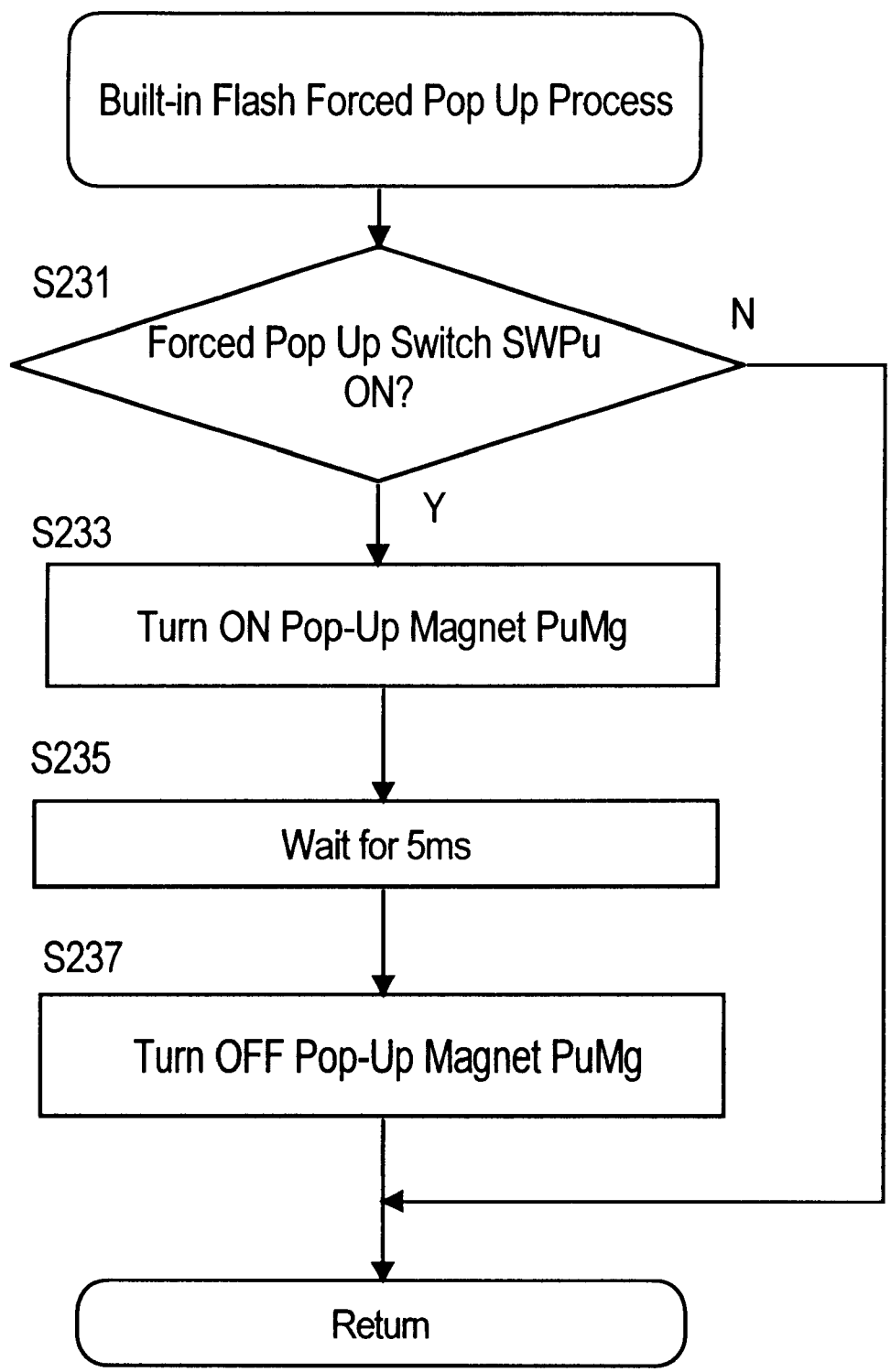
FIG. 7 is a flow chart of the subroutine "Built-in Flash Forced Pop-up Process" shown in FIG. 6.

The built-in flash forced pop-up process, which is performed at step S213 in the built-in flash pop-up process described in FIG. 6, will be hereinafter discussed in detail with reference to the flow chart shown in FIG. 7. In this process, firstly it is determined whether the forced pop-up switch SWPu (forced discharge switch) is ON (step S231). If it is determined that the forced pop-up switch SWPu is ON, the pop-up magnet PuMg is turned ON (power starts to be supplied) at step S233. Subsequently, control waits for 5 ms so that power keeps to be supplied to the pop-up magnet PuMg for 5 ms (step S235). Subsequently, the engagement of the hold mechanism with the built-in flash 111 is released by turning the pop-up magnet PuMg OFF to make the built-in flash 111 pop-up by the spring force of the spring of the pop-up mechanism (step S237). The pop-up state detection switch SWPud is turned ON when the built-in flash 111 has risen, so that the CPU 11 can determine that the built-in flash 111 has risen by checking the ON/OFF state of the pop-up state detection switch SWPud. It is determined at step S231 that the forced pop-up switch SWPu is not ON, control skips the operation from step S231 to S237 to return to the main process.

[Built-in Flash Auto Pop-up Process]

Figure 8:
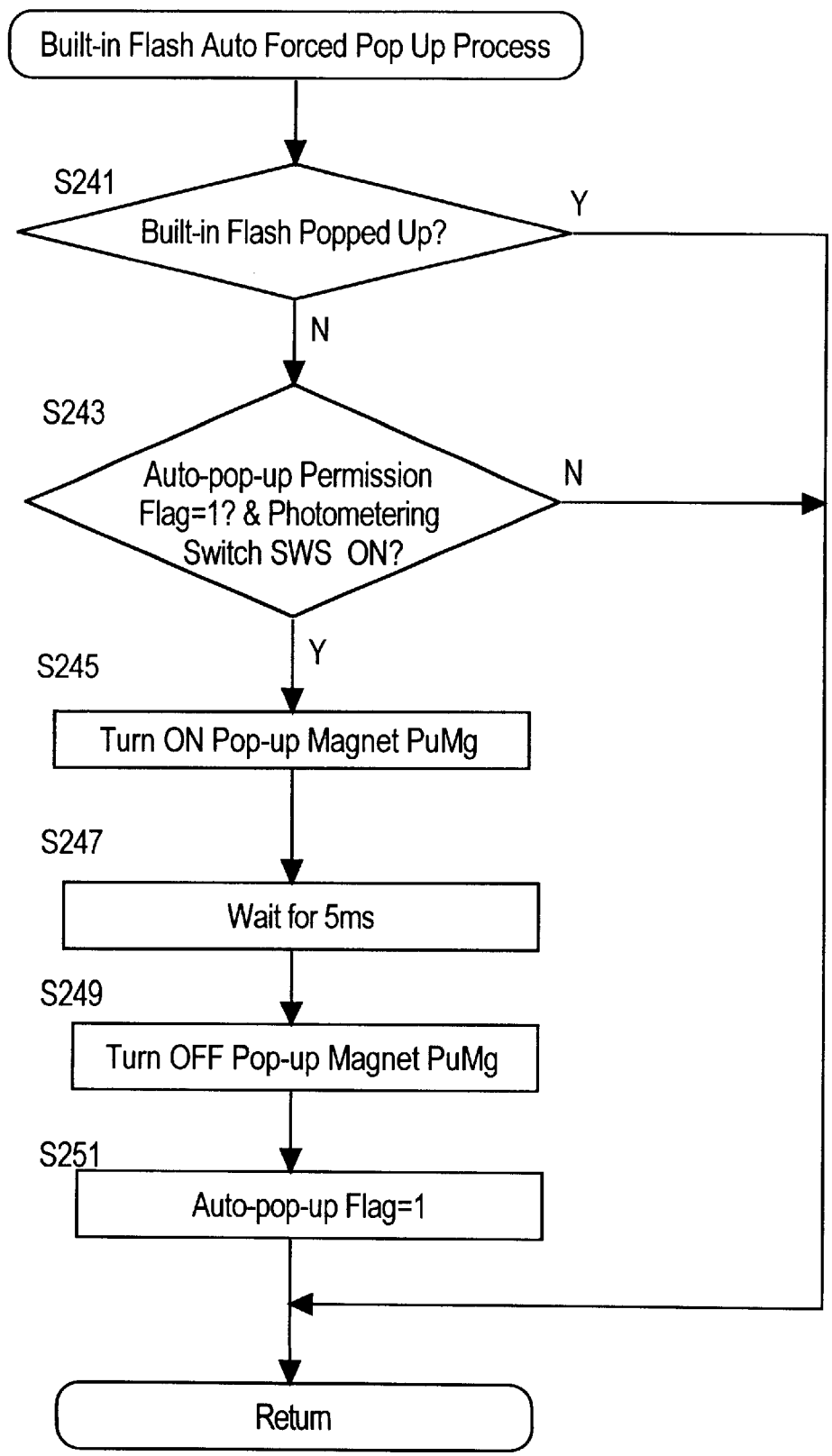
FIG. 8 is a flow chart of the subroutine "Built-in Flash Auto Pop-up Process" shown in FIG. 6.

The built-in flash auto pop-up process, which is performed at step S217 in the built-in flash pop-up process described in FIG. 6, will be hereinafter discussed in detail with reference to the flow chart shown in FIG. 8. As can be seen from the flow chart shown in FIG. 8, in a state where the built-in flash 111 is retracted, it is popped up through the built-in flash auto pop-up process when conditions necessary for having the built-in flash 111 discharge are all set. In the built-in flash auto pop-up process, firstly it is determined whether the pop-up state detection switch SWPud is ON so as to know if the built-in flash 111 has popped (step S241). If it is determined at step S241 that the pop-up state detection switch SWPud is ON, it means that the built-in flash 111 has already popped, so that control returns to the main process. If the pop-up state detection switch SWPud is not ON, it is determined whether an auto-pop-up permission flag is 1 while the photometering switch SWS is ON (step S243).

The auto-pop-up permission flag is set to 1 on condition that the built-in flash 111 is retracted if it is judged in the AE calculation process (which includes an auto-discharge judging process shown in FIGS. 11A and 11B) that the built-in flash 111 should discharge. If the auto-pop-up permission flag is not 1 or the photometering switch SWS is not ON at step S243, control returns to the main process. If the auto-pop-up permission flag is 1 while the photometering switch SWS is ON at step S243, control proceeds to step S245. The pop-up magnet PuMg is turned ON (power starts to be supplied) at step S245. Subsequently, control waits for 5 ms so that power continues to be supplied to the pop-up magnet PuMg for 5 ms (step S247). Subsequently, the engagement of the hold mechanism with the built-in flash 111 is released by turning the pop-up magnet PuMg OFF to make the built-in flash 111 pop-up by the spring force of the spring of the pop-up mechanism (step S249). Subsequently, the auto-pop-up flag is set to 1 (step S251) and control returns to the main process.

If the built-in flash 111 is made to pop-up in the built-in flash pop-up process performed at step S65 in the main process shown in FIG. 5B, the pop-up state detection switch SWPud is turned ON and the auto-pop-up flag is set to 1. Therefore, the next time control re-enters the built-in flash pop-up process, control comes out of the built-in flash pop-up process from step S205 (FIG. 6) to return to the main process. On the other hand, if the built-in flash 111 is retracted manually by the user after the built-in flash 111 is popped up, the pop-up state detection switch SWPud is turned OFF, so that at step S207 control proceeds to step S209 in the built-in flash pop-up process when control enters it for the first time since the pop-up state detection switch SWPud is turned OFF. Thereafter, the flashlight prohibition flag is set to 1, the auto-pop-up flag is set to 0 and control returns to the main process. Thereafter, the flashlight prohibition flag remains at 1 while the photometering switch SWS is held ON until the photometering timer, which is started at step S51, has elapsed. Thereafter, if control enters the built-in flash pop-up process at step S65 in the main process shown in FIG. 5B, at step S203 control comes out of the built-in flash pop-up process to return to the main process. According to this control, even if the auto-flashlight permission flag is set to 1 and at the same time the photometering switch SWS is turned ON, the built-in flash 111 is not automatically popped up. After the photometering timer has elapsed, the flashlight prohibition flag is set to 0 at step S89 in the main process shown in FIG. 5B. Therefore, if control enters the built-in flash pop-up process at step S65, the built-in flash 111 is automatically popped up on condition that the auto-flashlight permission flag is set to 1 while the photometering switch SWS is turned ON. In the case where the flash-prohibiting auto picture mode has been selected, since the built-in flash forced pop-up process at step S213 in the built-in flash pop-up process shown in FIG. 6 is not performed, the built-in flash 111 does not pop up even if the forced pop-up switch SWPu is turned ON. Namely, in the case where the flash-prohibiting auto picture mode has been selected, the built-in flash 111 is prohibited from discharging even if the user manually operates the forced pop-up button 119 to forcibly discharge the built-in flash 111.

[AE Calculation Process]

Figure 9:
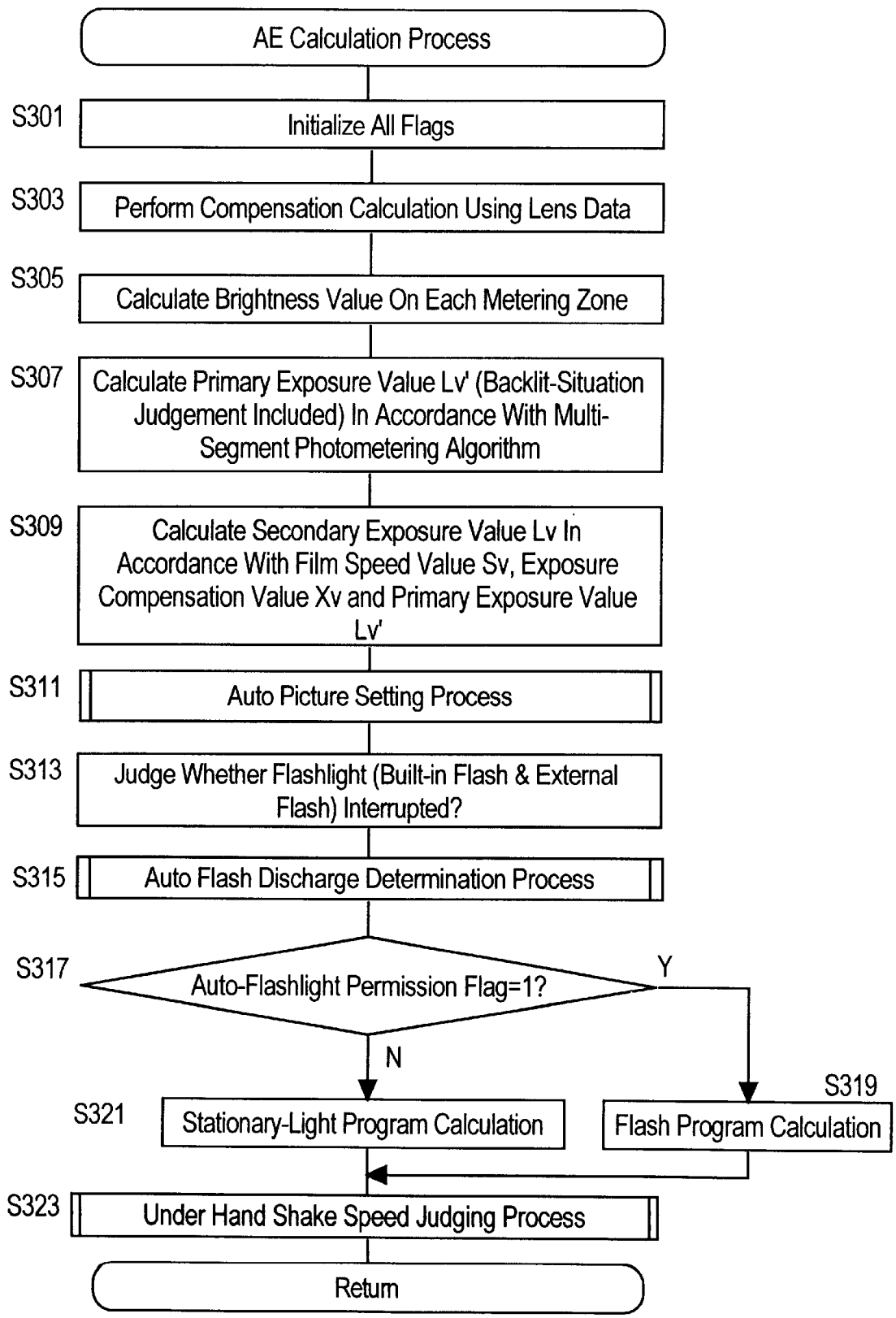
FIG. 9 is a flow chart of the subroutine "AE Calculation Process" shown in FIG. 5B.

The AE calculation process, which is performed at step S63 in the main process shown in FIG. 5B, will be hereinafter discussed in detail with reference to the flow chart shown in FIG. 9. In this process, firstly, all flags which are associated with the AE calculation process such as an under-hand-shake-speed flag are set to 0 (step S301). Subsequently, a predetermined compensation calculation is performed using the lens data such as the open aperture value and the minimum aperture value of the lens 61 which are input to the CPU 11 from the lens CPU 63 when the CPU 11 has communicated with the lens CPU 63 at step S57 (step S303). Subsequently, a brightness value is calculated on each metering zone in accordance with the photometering signals input from the photometering IC 41 (step S305), and a primary exposure value Lv' is calculated in accordance with a multi-segment photometering algorithm (step S307). Thereafter, a secondary exposure value Lv which is used for the exposure control is calculated in accordance with a film speed value Sv, an exposure compensation value Xv and the primary exposure value Lv' (step S309).

Subsequently, an auto picture setting process ("Auto Picture Setting Process" described in FIG. 10) for setting an exposure mode selected by an operation of the mode dial 121 is performed (step S311). Details of the auto picture setting process will be discussed later. Subsequently, it is judged whether the flashlight emitted from the built-in flash 111 will be interrupted by part of the attached lens 61 and at the same it is judged whether the flashlight emitted from the external flash 71 attached to the hot shoe 113 will be interrupted by part of the attached lens 61, in accordance with the information on flashlight interruption of the built-in flash 111 by the attached lens, the information on flashlight interruption of the external flash 71 by the attached lens and the lens information on the attached lens 61 (step S313). "Flashlight interruption" means that the flashlight emitted from the built-in flash 111 or the external flash 71 is interrupted by part of the attached lens 61. Accordingly, the flashlight does not cover center lower part of the object area, so that the center lower part appears dark. In the present embodiment, in order to prevent such a problem from occurring, if it is judged at step S313 that flashlight emitted from the built-in flash 111 and/or the external flash 71 will be interrupted by part of the attached lens 61, this judgement is stored in the internal RAM of the CPU 11 so that the built-in flash 111 or the external flash 71 does not discharge in an auto flash discharge determination process performed at step S315.

The auto flash discharge determination process ("Auto Flash Discharge Determination Process" described in FIGS. 11A and 11B) is performed at step S315. If the auto-flashlight permission flag is set to 1 in the auto flash discharge determination process, the CPU 11 judges whether the built-in flash 111 or the external flash 71 should discharge in accordance with predetermined conditions in a program calculation process. Details of the auto flash discharge determination process will be discussed later. If the CPU 11 judges that the built-in flash 111 or the external flash 71 should discharge, the built-in flash 111 or the external flash 71 discharges in a shutter release process ("Shutter Release Process" described in FIG. 13) at step S95.

After the auto flash discharge determination process is performed, it is determined at step S317 whether the auto-flashlight permission flag is 1. If the auto-flashlight permission flag is 1, a flash program calculation used on a flashlight-permission condition is performed to calculate the optimum shutter speed and the optimum aperture value (step S319). If the auto-flashlight permission flag is not 1, a stationary-light program calculation used on a flashlight-prohibition condition is performed to calculate the optimum shutter speed and the optimum aperture value (step S321). At step S321, in accordance with a predetermined algorithm prepared for each programmed exposure mode selected at step S311, the optimum shutter speed (Tv) and the optimum aperture value (Av) are calculated using the secondary exposure value Lv calculated at step S309. At step S319, the optimum shutter speed (Tv), which is equal to or slower than the flash synchronization speed, and the optimum aperture value (Av) for providing an optimum exposure are calculated by taking information on distance codes "dvcode" (which will be discussed later) and information on the guide number of each of the built-in flash 111 and the external flash 71 into account. After the operation at step S319 or S321 is performed, an under hand-shake speed judging process is performed (step S323).

In the under hand-shake speed judging process, it is determined whether the shutter speed calculated in the stationary-light program calculation at step S321 or the flash program calculation at step S319 is slower than the slowest shutter speed calculated to prevent blurred images due to hand movement. Details of the under hand-shake speed judging process will be discussed later. If the shutter speed calculated in the stationary-light program calculation at step S321 or the flash program calculation at step S319 is slower than the slowest shutter speed, the red LED 47b is turned ON in the finder LCD backlight lighting process at step S73 to illuminate the finder LCD 45 by red light so as to warn the user that a desired image will not be obtained.

[Auto Picture Setting Process]

Figure 10:
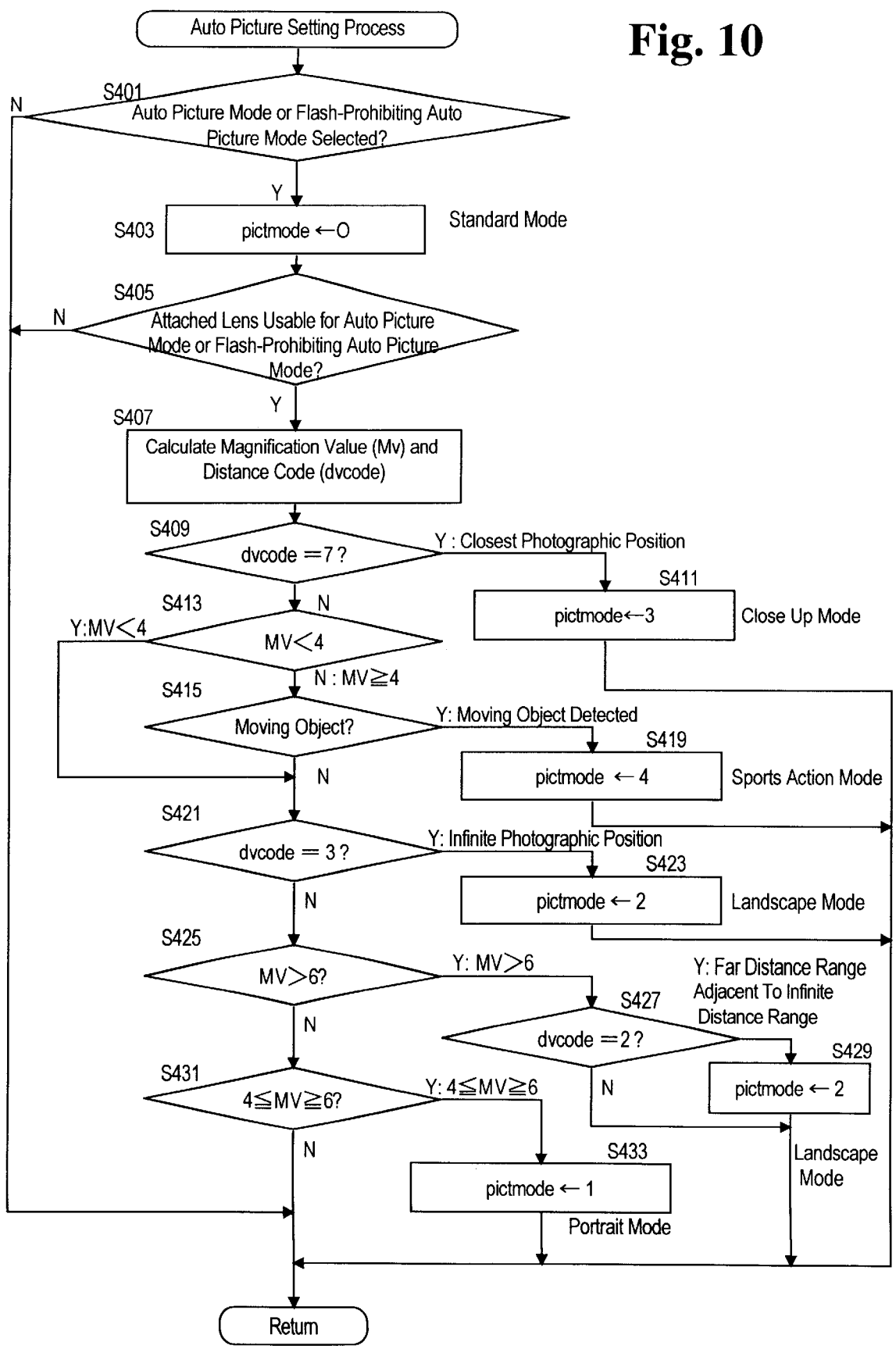
FIG. 10 is a flow chart of the subroutine "Auto Picture Setting Process" shown in FIG. 9.

The auto picture setting process, which is performed at step S311 in the AE calculation process shown in FIG. 9, will be hereinafter discussed in detail with reference to the flow chart shown in FIG. 10. In this process, if the flash-prohibiting auto picture mode or the auto picture mode is selected by an operation of the mode dial switch SWMod, the most appropriate program mode (program line) is selected from the five picture modes (the sports action mode, the close-up mode, the landscape mode, the portrait mode and the standard mode) in accordance with the object distance, the photographic magnification and the moving-object detection information. In the present embodiment, the night portrait mode, which is one of the eight program modes, is not selected in the auto picture setting process because the shutter speed will be slower than the slowest shutter speed calculated to prevent blurred images due to hand movement. The object distance used in the auto picture setting process is that which is determined by the position of the focal lens group L which is obtained in the operation at step S53 (FIG. 5B), while the photographic magnification used in the auto picture setting process is that which is determined by the focal length of the interchangeable lens 61 and the object distance (i.e., the position of the focal lens group L).

The lens CPU 63 of the interchangeable lens 61 detects the position of the focal lens group L with the distance code plate 65 which divides the movable range of the focal lens group L from the closest photographing position to the infinite photographing position into a plurality of sections to output the detected position of the focal lens group L to the CPU 11. Thereafter, the CPU 11 converts the input detected position of the focal lens group L into a corresponding one of eight distance codes "dvcode" 0 through 7. In the present embodiment, the eight distance codes "dvcode" are determined as follows.
(Distance Code)

| | |
|---|---|
| 7 | Closest Photographic Position |
| 6 | ↑ |
| 4 | . |
| 5 | . |
| 1 | . |
| 0 | . |
| 2 | ↓ |
| 3 | Infinite Photographic Position |

The moving-object detection information is that which judges that the object to be photographed is in motion in the AF operation at step S77 shown in FIG. 5B in the case where the object cannot be brought into focus more than one time even if the focal lens group L is driven to move to an in-focus position, which is calculated in accordance with the amount of defocus of the object that is detected via the AF CCD image sensor 33. In the present embodiment, the object brightness, the object distance and the photographic magnification are converted into a brightness value Bv, a distance value Dv and a magnification value Mv, respectively, according to the APEX system (additive system of photographic exposure).

In the auto picture setting process, firstly, it is determined whether one of the auto picture mode or the flash-prohibiting auto picture mode has been selected (step S401). If neither the auto picture mode or the flash-prohibiting auto picture mode has been selected, control returns to the AE calculation process. If the auto picture mode or the flash-prohibiting auto picture mode has been selected, pictmode (a variable for representing one of the five picture modes: the sports action mode, the close-up mode, the landscape mode, the portrait mode and the standard mode) is set to 0 (step S403). In the present embodiment, the pictmodes 0, 1, 2, 3 and 4 represent the standard mode, the portrait mode, the landscape mode, the close-up mode and the sports action mode, respectively.

Subsequently, it is determined whether the attached interchangeable lens 61 includes a lens CPU wherein which each of the auto picture mode and the flash-prohibiting auto picture mode is possible (step S405). If it is determined at step S405 that the attached interchangeable lens 61 does not include such a lens CPU, the pictmode remains 0 and control returns to the AE calculation process. If the attached interchangeable lens 61 includes such a lens CPU, the magnification value Mv and the distance code "dvcode" are calculated in accordance with the lens data input in the operation at step S57 (step S407).

The magnification value Mv is calculated using the following formula:

$$\log_2(\text{object distance/focal length}).$$

Subsequently, it is determined whether the distance code "dvcode" is 7, namely, it is determined whether the focal lens group L is positioned at the closest photographic position thereof (step S409). If the focal lens group L is positioned at the closest photographic position, the pictmode is set to 3 (the close-up mode) at step S411 and subsequently control returns to the AE calculation process.

If it is determined at step S409 that the distance code "dvcode" is not 7, it is determined whether the magnification value Mv is less than 4 (step S413). If the magnification value Mv is not less than 4, it is determined whether the object to be photographed has been identified as a moving object (step S415). If the object has been identified as a moving object, the pictmode is set to 4 (the sports action mode) at step S419 and subsequently control returns to the AE calculation process.

If it is determined at step S413 that the magnification value Mv is smaller than 4 or if it is determined at step S415 that the object to be photographed is not identified as a moving object, it is determined whether the distance code "dvcode" is 3, namely, it is determined whether the focal lens group L is positioned at the infinite photographic position thereof (step S421). If the focal lens group L is positioned at the infinite photographic position, the pictmode is set to 2 (the landscape mode) at step S423 and subsequently control returns to the AE calculation process.

If it is determined at step S421 that the distance code "dvcode" is not 3, it is determined whether the magnification value Mv is greater than 6 (step S425). If the magnification value Mv is greater than 6, it is determined whether the distance code "dvcode" is 2 (step S427). The distance code "dvcode" 2 corresponds to a far distance range adjacent to an infinite distance range. If it is determined at step 427 that the distance code "dvcode" is 2, the pictmode is set to 2 (the landscape mode) at step S429 and control returns to the AE calculation process. If it is determined at step 427 that the distance code "dvcode" is not 2, the pictmode remains at 0 (i.e. the standard mode) and control returns to the AE calculation process.

If it is determined at step S425 that the magnification value Mv is not greater than 6, it is determined whether the magnification value Mv is greater than or equal to 4 and less than or equal to 6 (step S431). If the magnification value Mv is within this range (4Mv6), the pictmode is set to 1 (the portrait mode) at step S433 and subsequently control returns to the AE calculation process. If the magnification value Mv is not within this range, the pictmode remains at 0 and control returns to the AE calculation process.

According to the above process, the most appropriate programmed exposure mode (pictmode) is chosen from the sports action mode, the close-up mode, the landscape mode, the portrait mode and the standard mode in accordance with the photographic situation. Although neither the algorithm or the program line for each programmed exposure mode is illustrated, in the sports action mode a faster shutter speed is selected than in the standard mode to capture (photograph) an object in motion.

Thereafter, according to the selected pictmode, the stationary-light program calculation is performed at step S321 or the flash program calculation is performed at step S319 to calculate the optimum shutter speed and the optimum aperture value.

[Auto Flash Discharge Determination Process]

Figure 11A:
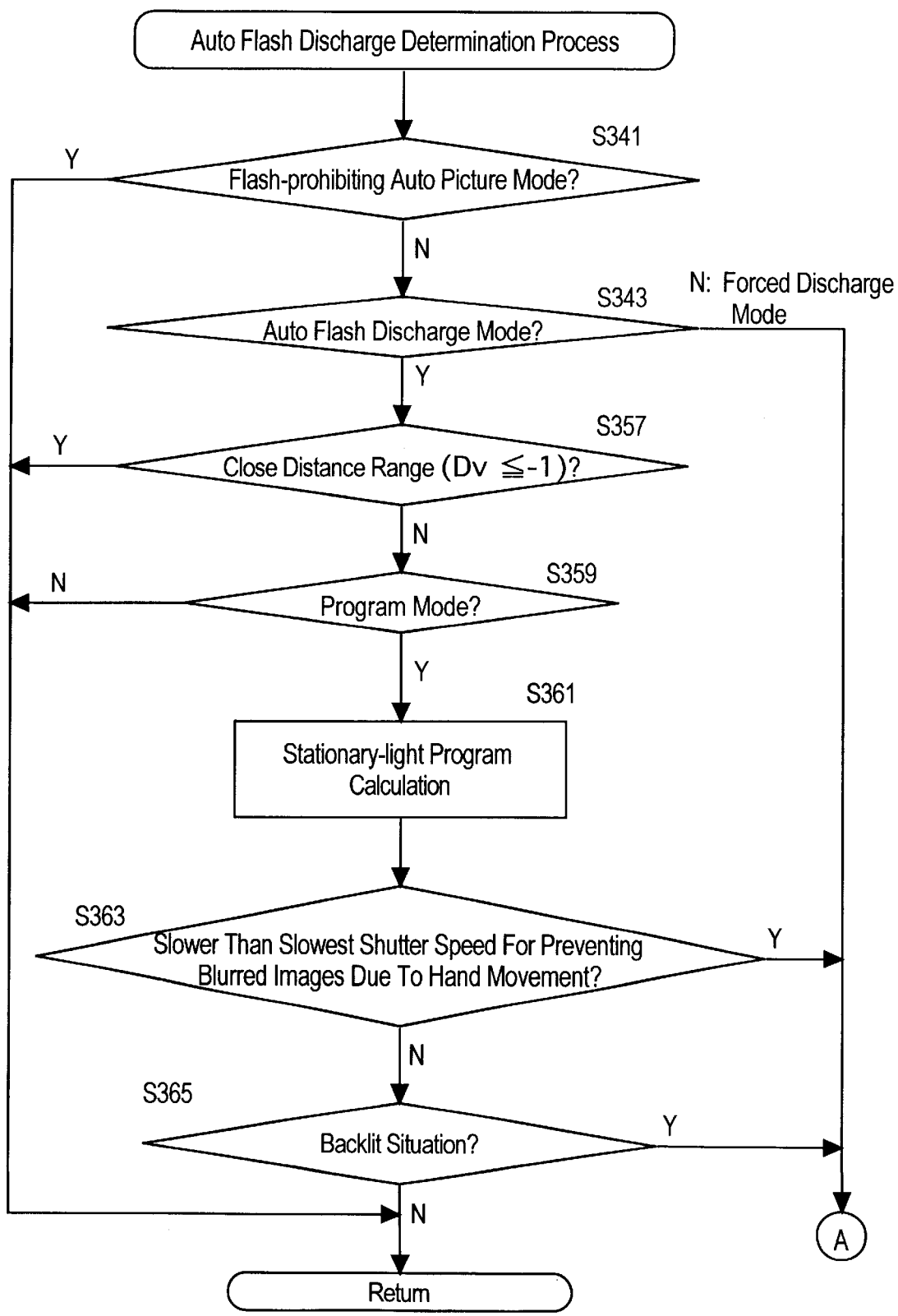
FIGS. 11A and 11B show a flow chart of "Auto Flash Discharge Determination Process" shown in FIG. 9.
Figure 11B:
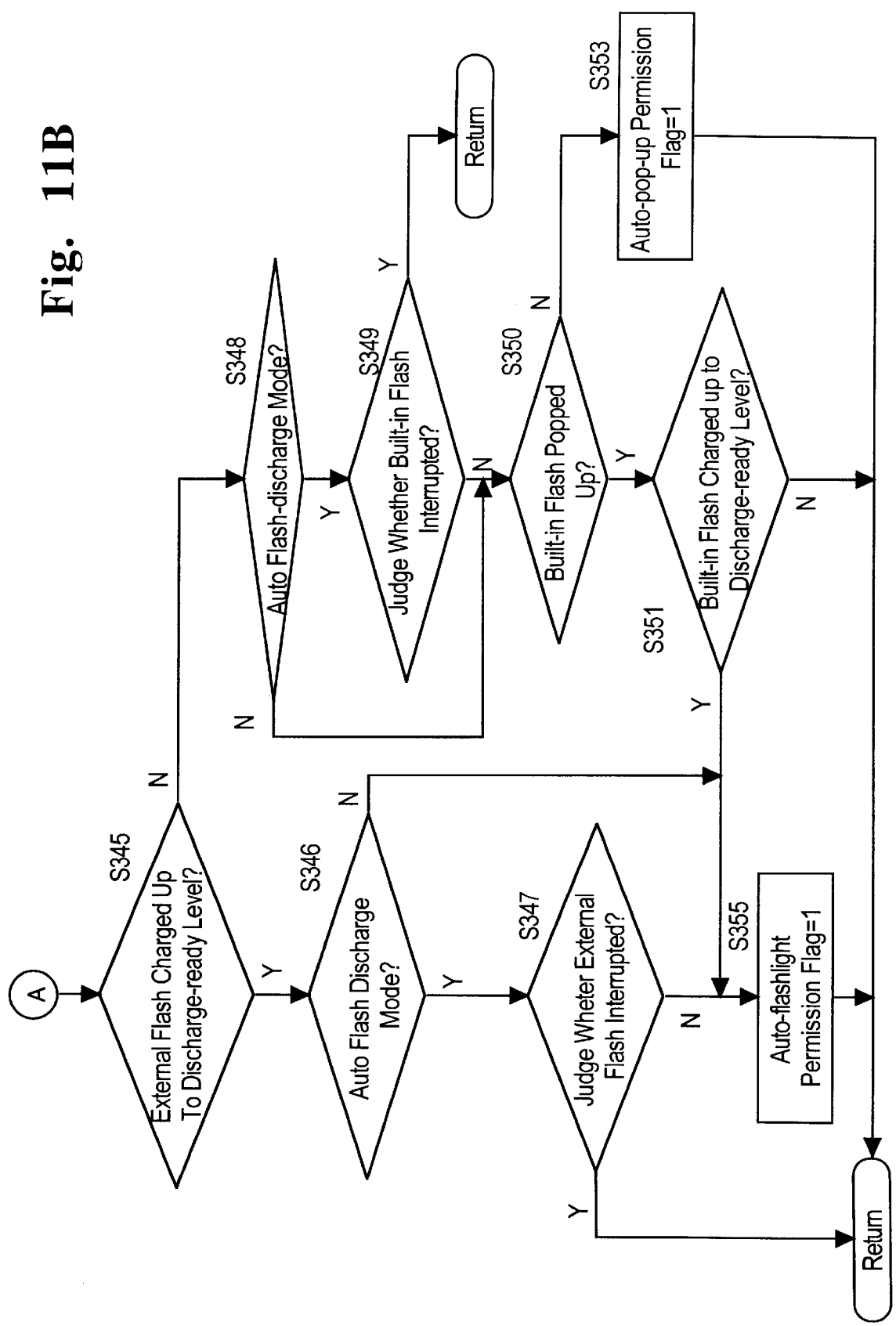

The auto flash discharge determination process, which is performed at step S315 in the AE calculation process described in FIG. 9, will be hereinafter discussed in detail with reference to the flow chart shown in FIGS. 11A and 11B. In this process, firstly, it is determined whether the flash-prohibiting auto picture mode has been selected by checking the state of the mode dial switch SWMod (step S341). If the flash-prohibiting auto picture mode has been selected, it means that the built-in flash 111 and the external flash 71 are prohibited from discharging, so that control returns to the AE calculation process. If a mode other than the flash-prohibiting auto picture mode has been selected, it is determined whether an auto flash discharge mode has been selected (step S343).

If it is determined at step S343 that the auto flash discharge mode is not selected, it means that a forced discharge mode has been selected, so that control proceeds to step S345 at which it is determined whether the external flash 71 has been charged up to a discharge-ready level thereof.

If it is determined at step S345 that the external flash 71 has been charged to the discharge-ready level, it is determined whether the auto flash discharge mode has been selected (step S346). If the auto flash discharge mode has been selected, it is determined whether, at step S313, the flashlight emitted from the external flash 71 attached to the hot shoe 113 was judged as being interrupted by part of the attached lens 61 (step S347). If such judgement was made at step S313, the external flash 71 is not permitted to discharge, and control returns to the AE calculation process. Otherwise, the auto-flashlight permission flag, which indicates whether the built-in flash 111 is permitted from discharging automatically, is set to 1 (step S355) and control returns to the AE calculation process. If it is determined at step S346 that the auto flash discharge mode is not selected, the auto-flashlight permission flag is set to 1 (step S355) and control returns to the AE calculation process.

If it is determined at step S345 that the external flash 71 has not yet been charged to the discharge-ready level (this is also true to the case where the external flash 71 is not attached to the hot shoe 113), it is determined whether the auto flash discharge mode has been selected (step S348). If the auto flash discharge mode has been selected, it is determined whether it was judged at step S313 that the flashlight emitted from the built-in flash 111 will be interrupted by part of the attached lens 61 (step S349). If such a judgement was made, the built-in flash 111 is not permitted to discharge, and control returns to the AE calculation process. Otherwise, it is determined whether the built-in flash 111 has popped up by checking the ON/OFF state of the pop-up state detection switch SWPud (step S350). Likewise, if it is determined at step S348 that the auto flash discharge mode is not selected, it is determined whether the built-in flash 111 has popped up by checking the ON/OFF state of the pop-up state detection switch SWPud (step S350).

If it is determined at step S350 that the built-in flash 111 has popped up, it is determined whether the built-in flash 111 has been charged up to a discharge-ready level thereof (step S351). If the built-in flash 111 has been charged up to the discharge-ready level, the auto-flashlight permission flag is set to 1 (step S355) and control returns to the AE calculation process. If it is determined at step S351 that the built-in flash 111 has not been yet charged up to the discharge-ready level, control returns to the AE calculation process.

If it is determined at step S350 that the built-in flash 111 has not popped up, it means that the built-in flash 111 is retracted or currently on the way to the fully-popped up position and therefore is not properly directed forwardly, so that the auto-pop-up permission flag is set to 1 (step S353) and subsequently control returns to the AE calculation process.

If the auto-pop-up permission flag is set at 1, in the built-in flash auto pop-up process (FIG. 6), control proceeds from step S243 to step S245 on condition that the photometering switch SWS is ON, so that the built-in flash 111 pops up automatically.

If it is determined at step S343 that the auto flash discharge mode has been selected, it is determined whether the object distance, which is obtained in the data-communication of the CPU 11 with the lens CPU 63, is equal to or shorter than a predetermined distance, namely, within a close distance range (step S357). If it is determined at step S357 that the object distance is within the close distance range, control returns to the AE calculation process. In the case where the object distance is too short, the automatic flashlight control does not work effectively. This may result in an over-exposure. In the present embodiment, if the distance value Dv is equal to or less than −1 (approximately 70 cm), the CPU 11 judges that the object distance is within the close distance range, so that in this case the CPU 11 controls each of the built-in flash 111 and the external flash 71 not to automatically discharge.

If it is determined at step S357 that the object distance, which is obtained in the data-communication of the CPU 11 with the lens CPU 63, is not equal to or less than the predetermined distance (i.e., the object distance is longer than the predetermined distance), it is determined whether one of the eight program modes (the flash-prohibiting auto picture mode, the night portrait mode, the sports action mode, the close-up mode, the landscape mode, the portrait mode, the standard mode, and the auto picture mode) has been selected (step S359). If it is determined at step S359 that a mode other than the eight program modes has been selected (i.e., one of the manual exposure mode, a shutter-priority AE mode or the program AE mode has been selected), whether the built-in flash 111 or the external flash 71 should be used or not depends on the user, so that control returns to the AE calculation process.

If it is determined at step S359 that one of the eight program modes has been selected, a stationary-light program calculation is performed to calculate the optimum shutter speed and the optimum aperture value (step S361). Subsequently, it is determined whether the shutter speed calculated in the stationary-light program calculation at step S361 is slower than the slowest shutter speed calculated to prevent blurred images which may be caused by hand movement (step S363). Subsequently, it is determined whether an object to be photographed is in a backlit situation in accordance with the object brightness data obtained from the photometering IC 41 (step S365). If it is determined at step S363 that the calculated shutter speed is not slower than the required slowest shutter speed and if it is determined at step S365 that the object to be photographed is not in a backlit situation, control returns to the AE calculation process. If it is determined at step S363 that the calculated shutter speed is slower than the required slowest shutter speed or if it is determined at step S365 that the object to be photographed is in a backlit situation, control proceeds to step S345 so as to make the built-in flash 111 or the external flash 71 to discharge automatically.

[Picture Mode Indication Lighting Process]

Figure 12A:
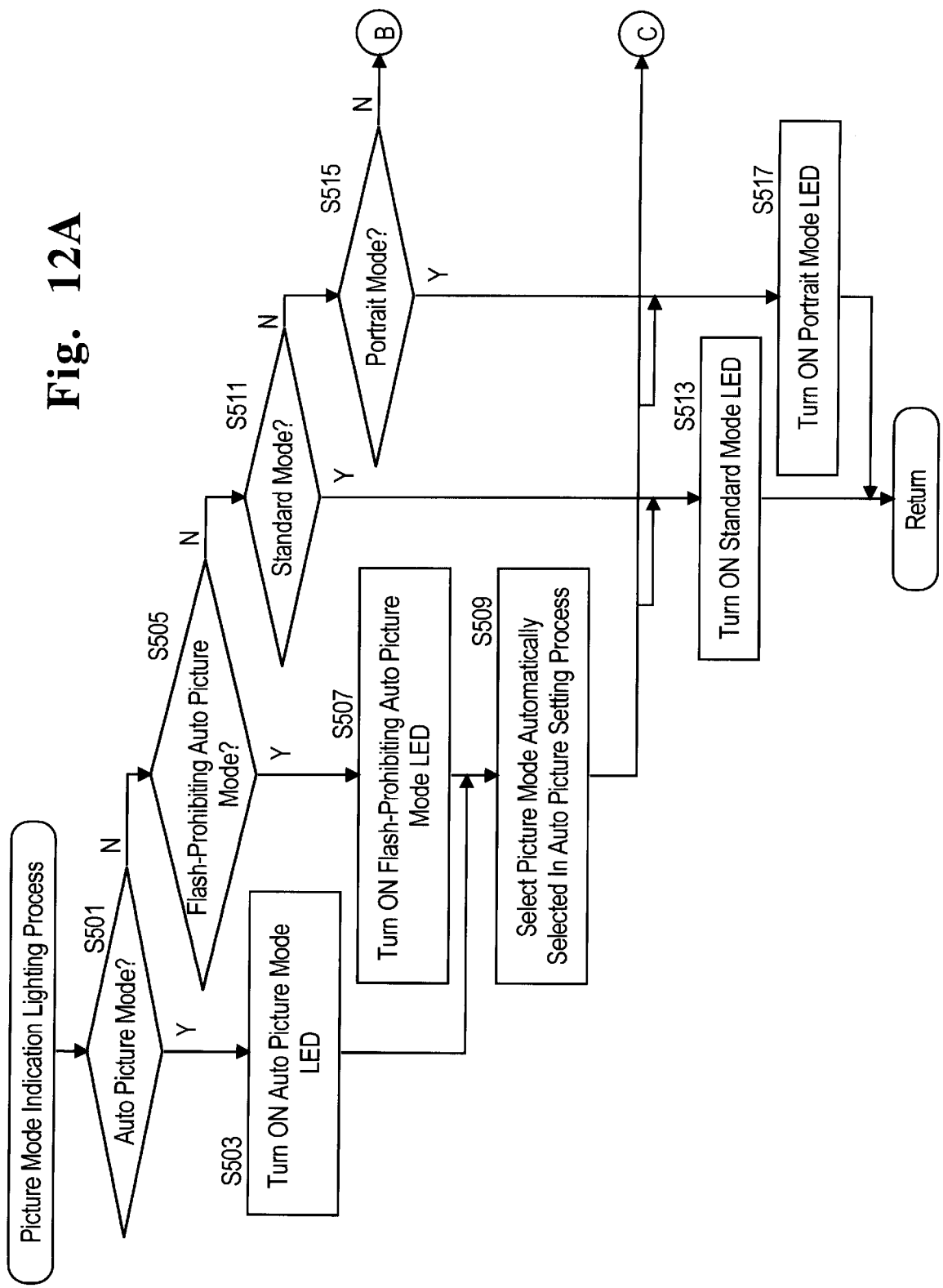
FIGS. 12A and 12B show a flow chart of the subroutine "Picture Mode Indication Lighting Process" shown in FIG. 5B.
Figure 12B:
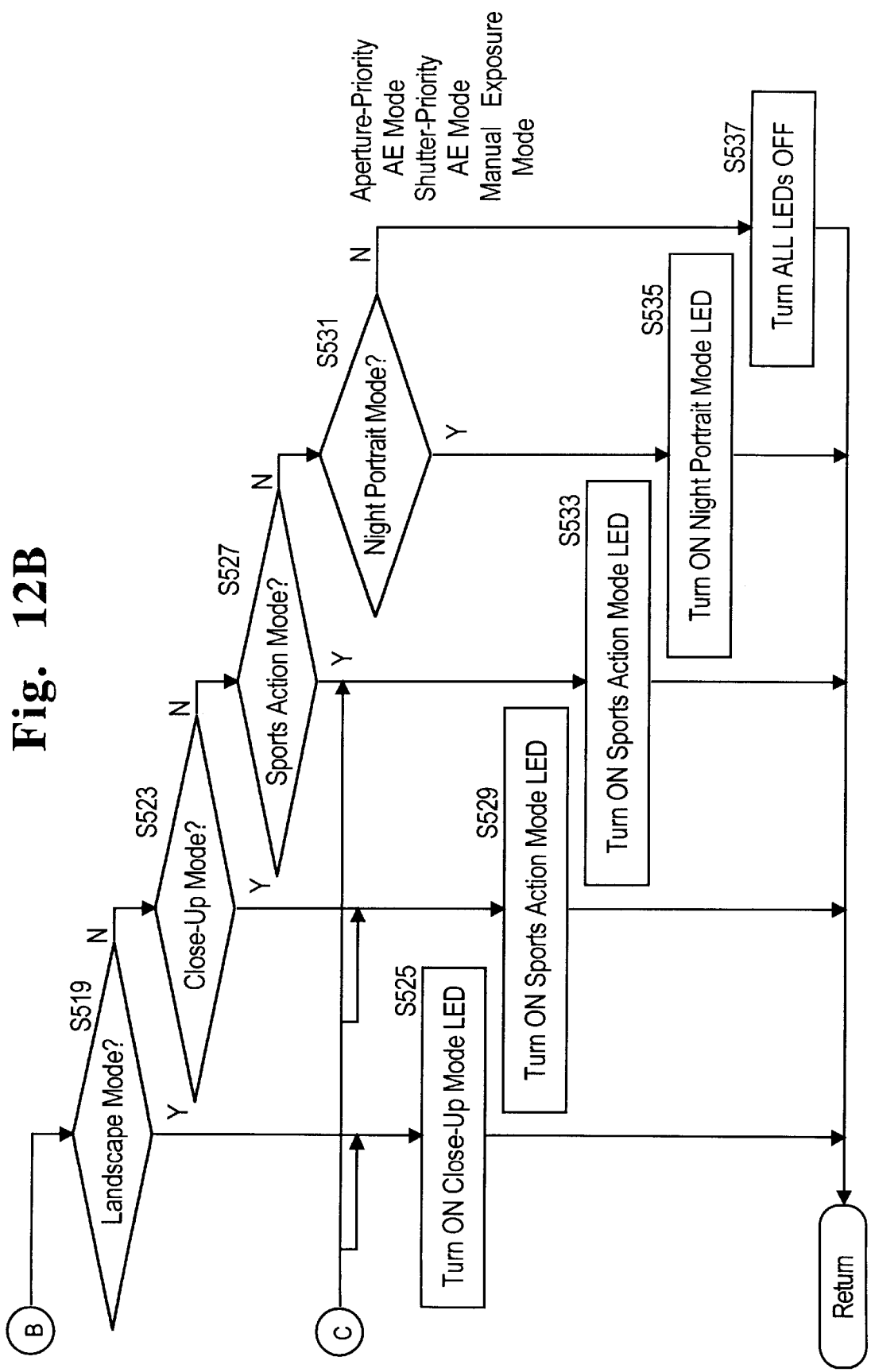

The picture mode indication lighting process, which is performed at step S75 in the main process shown in FIG. 5B, will be hereinafter discussed in detail with reference to the flow chart shown in FIGS. 12A and 12B. In this process, if the mode selected by an operation of the bezel 125 is one of the eight picture modes: the auto picture mode, the flash-prohibiting auto picture mode, the standard mode, the portrait mode, the close-up mode, the landscape mode, the sports action mode and the night portrait mode, the corresponding one of the eight LEDs 51*h*, 51*a*, 51*g*, 51*f*, 51*e*, 51*d*, 51*c* and 51*b* is turned ON, respectively. In the case where the auto picture mode or the flash-prohibiting auto picture mode is selected, one of the picture mode character illumination LEDS 51*a* through 51*h* which corresponds to a picture mode automatically selected is turned ON. None of the eight LEDs 51*a* through 51*h* are turned ON in the case where the shutter-priority AE mode, the aperture-priority AE mode or the manual mode is selected by an operation of the bezel 125. In the present embodiment, the color of the LED 51a for illuminating the character 124a of the mode indication disk 123 which represents the flash-prohibiting auto picture mode, the color of the LED 51h for illuminating the character 124h of the mode indication disk 123 which represents the auto picture mode, and the color of each of the remaining LEDs 51b through 51g are different from one another. This makes the camera settings easy to monitor. In the present embodiment, the LED 51a for the flash-prohibiting auto picture mode preferably emits red light as a typical warning color, the LED 51h for the auto picture mode preferably emits green light, the LED 51b for the night portrait mode (which is not selected in the auto picture mode) preferably emits orange light, and each of the remaining LEDs 51c through 51g preferably emits yellow light. However, it is possible to adapt any other color scheme.

In the picture mode indication lighting process, it is determined whether the mode selected by the mode dial switch SWMod is the auto picture mode, the flash-prohibiting auto picture mode, the standard mode, the portrait mode, the close up mode, the landscape mode, the sports action mode or the night portrait mode in this order (steps S501, S505, S511, S515, S519, S523, S527 and S531).

If the auto picture mode has been selected, the corresponding LED 51h is turned ON (stop S503). Subsequently, one of the five picture modes (the sports action mode, the close-up mode, the landscape mode, the portrait mode and the standard mode) which is automatically selected in the auto picture setting process (FIG. 10) in the AE calculation process is selected (step S509). Subsequently, one of the eight LEDs 51c through 51g which corresponds to the selected picture mode at step S509 is turned ON (step S513/S517/S525/S529/S533). Thereafter control returns to the main process.

Similarly, if the flash-prohibiting auto picture mode has been selected, the corresponding LED 51a is turned ON (step S507). Subsequently, one of the five picture modes which is automatically selected in the auto picture setting process (FIG. 10) in the AE calculation process is selected (step S509). Subsequently, one of the eight LEDs 51c through 51g which corresponds to the selected picture mode at step S509 is turned ON (step S513/S517/S525/S529/ S533). Thereafter control returns to the main process.

According to this process, in the auto picture mode or the flash-prohibiting auto picture mode, the LED 51h for the auto picture mode or the LED 51a for the flash-prohibiting auto picture mode is firstly turned ON and also one of the eight LEDs 51c through 51g which corresponds to the automatically-selected picture mode is turned ON, so that the user can be easily informed of the selected program exposure mode in the auto picture mode or the flash-prohibiting auto picture mode by monitoring the state of illumination of each character 124a, 124c, 124d, 124e, 125f, 125g and 125h.

If it is determined that either the auto picture mode or the flash-prohibiting auto picture mode has not been selected (steps S501 and S505) and if it is determined that the standard mode has been selected (step S511), the corresponding LED 51g is turned ON (step S513) and subsequently control returns to the main process. If it is determined that the portrait mode has been selected (step S515), the corresponding LED 51f is turned ON (step S517) and subsequently control returns to the main process. If it is determined that the landscape mode has been selected (step S519), the corresponding LED 51e is turned ON (step S525) and subsequently control returns to the main process. If it is determined that the close-up mode has been selected (step S523), the corresponding LED 51d is turned ON (step S529) and subsequently control returns to the main process. If it is determined that the sports action mode has been selected (step S527), the corresponding LED 51c is turned ON (step S533) and subsequently control returns to the main process. If it is determined that the night portrait mode has been selected (step S531), the corresponding LED 51b is turned ON (step S535) and subsequently control returns to the main process. If it is determined through the operations from step S511 to step S531 that none of the standard mode, the portrait mode, the close-up mode, the sports action mode and the night portrait mode have not been selected, all the LEDs 51a through 51h are turned OFF (step S537) and subsequently control returns to the main process.

[Shutter Release Process]

The shutter release process, which is performed at step S95 in the main process shown in FIG. 5B, will be hereinafter discussed in detail with reference to the flow chart shown in FIG. 13. In this process, firstly a mirror-engagement release magnet (not shown) is supplied with current to release the engagement of an engaging member with the quick-return mirror 160 so that the quick-return mirror 160 rises by a spring force of a spring (not shown) and at the same time the diaphragm control circuit 37 is controlled to stop down the iris diaphragm of the interchangeable lens 61 by an amount corresponding to the aperture value determined by the AE calculation process (step S601). Immediately after it is detected with a mirror-up detection switch (not shown) that the quick-return mirror 160 has completely risen, the shutter circuit 35 starts operating to perform an exposure process ("Exposure Process" described in FIG. 14) in which the shutter circuit 35 is controlled to release the focal plane shutter in accordance with the determined shutter speed (step S603). The details of the exposure process will be discussed later. Subsequently, upon the completion of the operation of the focal plane shutter a mirror-down/charge process, a shutter charge process and a film winding process are performed (Step S605). In the mirror-down/charge process, the charge motor 21 is driven to make the quick-return mirror 160 swing down while the drive springs of the leading and trailing curtains of the shutter mechanism are charged. In the shutter charge process, the leading and trailing curtains are moved back to the initial positioned thereof while a shutter charging spring is charged. In the film winding process, the film motor 25 is driven to wind film by one frame. Subsequently the flashlight prohibition flag is set to 0 (step S607) and control returns to the main process.

[Exposure Process]

The exposure process, which is performed at step S603 in the shutter release process described in FIG. 13, will be hereinafter discussed in detail with reference to the flow chart shown in FIG. 14. In this process, firstly the time value of a shutter timer is set to the value of the shutter speed (exposure) determined in the AE calculation process, and subsequently the shutter timer is started (step S621). Subsequently the leading curtain of the focal plane shutter is released to start moving (step S623). It is next determined whether the shutter speed determined in the AE calculation process is equal to or slower than the flash synchronization speed (step S625). If the shutter speed is faster than the flash synchronization speed, neither the built-in flash 111 or the external flash 71 should discharge. Accordingly, after the operation at step S625, control proceeds to step S639 at which it is determined whether the shutter timer has elapsed. If the counting of the shutter timer is up, the trailing curtain of the focal plane shutter is released to start moving (step S641) and subsequently control returns to the shutter release process.

If it is determined at step S625 that the shutter speed is equal to or slower than the flash synchronization speed, it is determined whether the movement of the leading curtain has completed (step S627). If the movement of the leading curtain has not yet completed, control repeats the checking operation at step S627. Thereafter, if the movement of the leading curtain has not yet completed, it is determined whether the flash-prohibiting auto picture mode has been selected (step S629). If the flash-prohibiting auto picture mode has been selected, neither the built-in flash 111 nor the external flash 71 should discharge. Accordingly, control proceeds to step S639. If the flash-prohibiting auto picture mode has not been selected, it is determined whether the auto-flashlight permission flag is 1, i.e., whether the built-in flash 111 or the external flash 71 can discharge (step S631). If the auto-flashlight permission flag is not 1, i.e., the built-in flash 111 or the external flash 71 cannot discharge, control proceeds to step S639. If it is determined at step S631 that the auto-flashlight permission flag is 1, control proceeds to step S633 at which an external flash discharge process is performed. In this process, a command signal (discharging signal) is sent to the external flash 71 to make it discharge in the case where the external flash 71 is attached to the hot shoe 113.

Subsequently, it is determined whether the built-in flash 111 has risen to the discharge position by determining if the pop-up state detection switch SWPud is turned ON (step S635). If the built-in flash 111 has risen to the discharge position, control proceeds to step S637 at which a built-in flash discharge process is performed to make the built-in flash 111 discharge. In the case where the external flash 71 is attached to the hot shoe 113, the built-in flash 111 is prohibited from popping up, so that at step S635 control proceeds to step S639.

In the external flash discharge process at step S633 and the built-in flash discharge process at step S637, normally, exposure from image light passing through the lens is measured by a suitable light-sensitive mechanism of a TTL photometering system (not shown). Subsequently, if the value of the exposure reaches the calculated exposure value, a command signal (discharge stop signal) is sent to the built-in flash 111 or the external flash 71 to stop discharging. Namely, in the case where the flash-prohibiting auto picture mode has been selected, the built-in flash pop-up process shown in FIG. 6 and the auto flash discharge determination process (FIGS. 11A and 11B) at step S315 in the AE calculation process shown in FIG. 9 are not performed, so that the auto-flashlight permission flag remains at zero. Therefore, in this case, at step S317 control always proceeds to step S321 at which the stationary-light program calculation is performed in the exposure mode selected in the auto picture mode in the auto picture setting process ("Auto Picture Setting Process" described in FIG. 10) performed at step S311.

Figure 13:
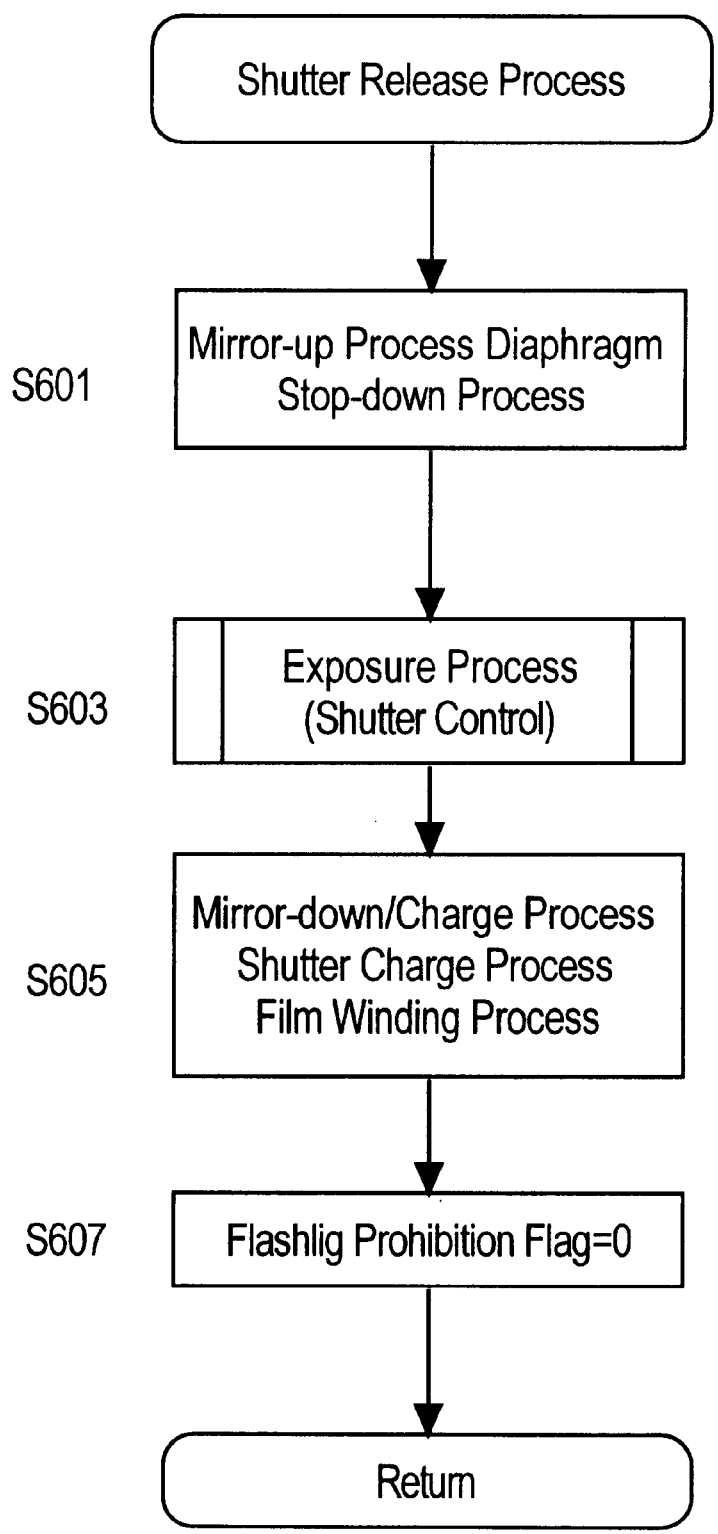
FIG. 13 is a flow chart of the subroutine "Shutter Release Process shown" in FIG. 5B.
Figure 14:
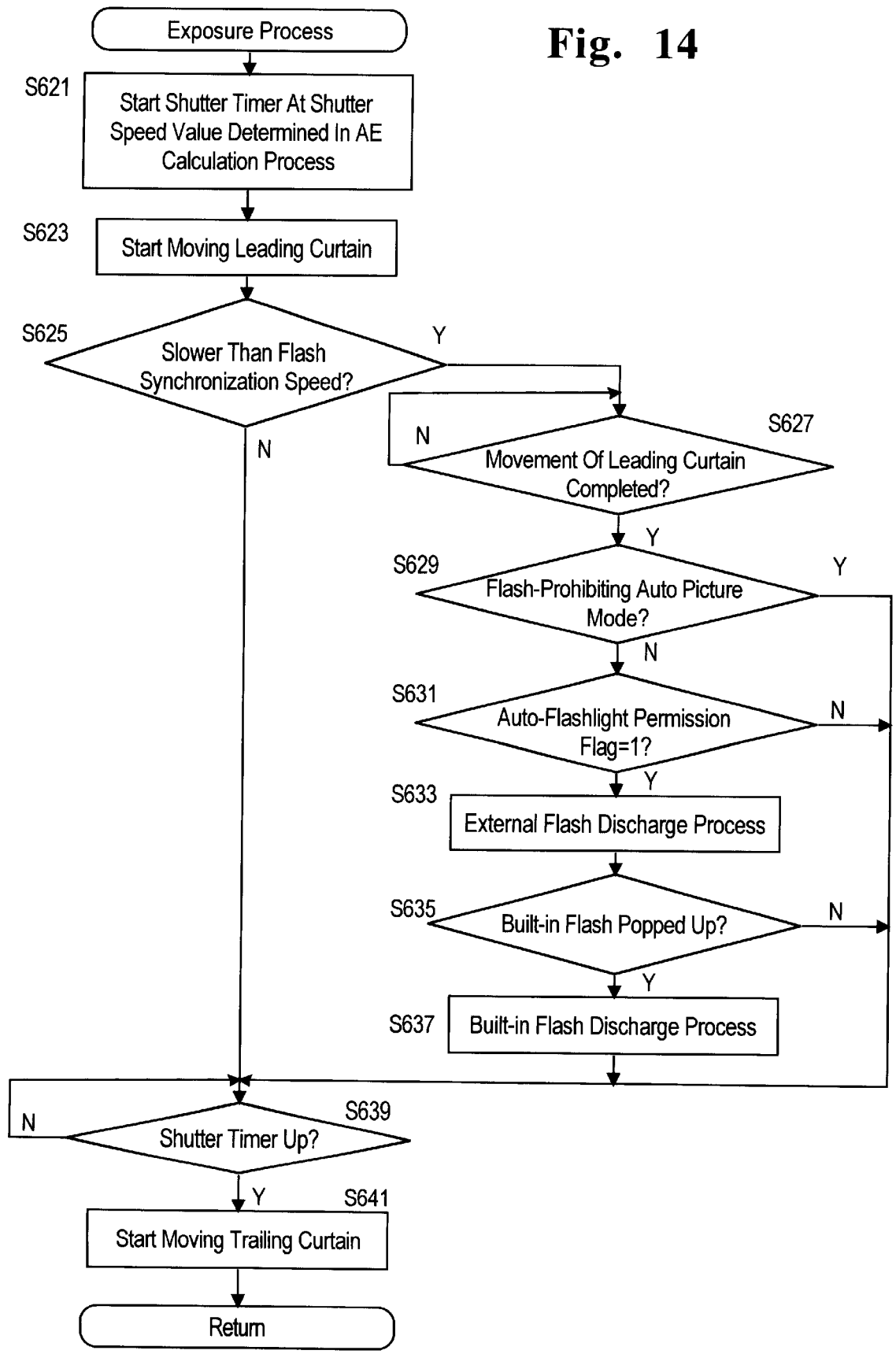
FIG. 14 is a flow chart of the subroutine "Exposure Process" shown in FIG. 13.

Thereafter, upon determining that the release switch SWR is turned ON at step S79 control proceeds to the shutter release process shown in FIG. 13. Thereafter, in the exposure process shown in FIG. 14, at step S629 control proceeds to step S639. Therefore, control skips S633 at which the external flash discharge process is performed through to step S637 at which the built-in flash discharge process is performed. Namely, regardless of the charge-completion state of the external flash 71 or the popped-up state of the built-in flash 111, each of the external flash 71 and the built-in flash 111 is reliably prohibited from discharging, so that an exposure mode (programmed AE mode) using no flashlight which is automatically selected through the auto picture setting process ("Auto Picture setting Process" described in FIG. 10) is performed.

As can be understood from the foregoing, since the controller includes different photographic modes; an auto-exposure-mode selecting mode in which an appropriate photographic mode is automatically selected from different photographic modes based on photographic conditions, the controller allowing the built-in flash to discharge automatically in the selected appropriate photographic mode when the built-in flash discharges at a most appropriate time of exposure; and a flash-prohibiting/auto-exposure-mode selecting mode in which an appropriate photographic mode is automatically selected from the different photographic modes based on photographic conditions, the controller prohibiting the built-in flash from discharging automatically in the selected appropriate photographic mode at a time of exposure, the user is free from the troublesome operation of setting an auto-flash prohibiting mode in an auto exposure mode. Furthermore, the most appropriate exposure mode is automatically selected from different exposure modes based on the photographic situation in each of the auto-exposure-mode selecting mode and the flash-prohibiting/auto-exposure-mode selecting mode, which makes it easy to handle the camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
   a built-in flash;
   a single manual operation member; and
   a controller for controlling said camera, said controller comprising:
   different photographic modes, selectable via said single manual operation member;
   an auto-exposure-mode selecting mode, selectable via said single manual operation member, in which said controller automatically selects an appropriate photographic mode from said different photographic modes based on photographic conditions, said controller allowing said built-in flash to discharge automatically in the selected appropriate photographic mode at a time of exposure, when indicated by the photographic conditions; and
   a flash-prohibiting/auto-exposure-mode selecting mode, selectable via said single manual operation member, in which said controller automatically selects an appropriate photographic mode from said different photographic modes based on photographic conditions, said controller prohibiting said built-in flash from discharging automatically in said selected appropriate photographic mode at a time of exposure, regardless of the photographic conditions.

2. The camera according to claim 1, wherein said single manual operation member comprises an operation dial, each of said different photographic modes, said auto-exposure-mode selecting mode and said flash-prohibiting/auto-exposure-mode selecting mode corresponding to a stop position of rotation of said operation dial.

3. The camera according to claim 1, wherein said built-in flash comprises a flashlight emitter movable between a retracted position and a raised position, wherein said flashlight emitter can discharge in the raised position.

4. The camera according to claim 3, wherein said camera further comprises a flash operation member which can be manually operated from outside the camera, wherein said controller controls said flashlight emitter to move from the retracted position to the raised position upon an operation of said flash operation member.

5. The camera according to claim 4, wherein said controller allows said built-in flash to discharge when said flashlight emitter is in the raised position.

6. The camera according to claim 4, wherein said controller controls said flash emitter prevents said flashlight emitter from moving from the retracted position to the raised position when in said flash-prohibiting/auto-exposure-mode selecting mode, even when said flash operation member is operated.

7. The camera according to claim 4, wherein said controller prevents said built-in flash from discharging in said flash-prohibiting/auto-exposure-mode selecting mode even when said flashlight emitter is in the raised position.

8. The camera according to claim 1, further comprising:
an external connector configured for connecting an external flash unit, said controller prohibiting the external flash from discharging in said flash-prohibiting/auto-exposure-mode selecting mode when the external flash unit is connected to said external connector.

9. The camera according to claim 1, wherein said appropriate photographic mode is automatically selected from said different photographic modes based on a low-light condition in said auto-exposure-mode selecting mode.

10. The camera according to claim 1, wherein said different photographic modes comprises a standard mode and a sports action mode, wherein a faster shutter speed is selected than in said standard mode in order to photograph an object in motion.

11. The camera according to claim 10, wherein said different photographic modes further comprises a close-up mode, a landscape mode and a portrait mode.

12. The camera according to claim 2, wherein said operation dial indicates the automatically selected appropriate photographic mode in each of said auto-exposure-mode selecting mode and said flash-prohibiting/auto-exposure-mode selecting mode by illuminating a character on said operation dial which corresponds to the appropriate photographic mode.

13. A controller for controlling a camera having an external connector to which an external flash unit can be connected, said controller comprising:
different photographic modes, selectable via
a single manual operation member;
an auto-exposure-mode selecting mode, selectable via the single manual operation member, in which said controller automatically selects an appropriate photographic mode from said different photographic modes based on photographic conditions, said controller allowing the external flash to discharge automatically in the selected appropriate photographic mode at a time of exposure, when indicated by the photographic conditions; and
a flash-prohibiting/auto-exposure-mode selecting mode, selectable via the single manual operation member, in which said controller automatically selects an appropriate photographic mode from said different photographic modes based on photographic conditions, said controller preventing the external flash from discharging automatically in the selected appropriate photographic mode at a time of exposure.

14. A camera comprising:
a built-in flash;
a manual operation member configured to be moved manually among at least four positions; and
a controller for controlling the camera, the controller comprising:
different photographic modes, comprising at least two exposure modes corresponding to exposure mode positions of the at least four positions of the manual operation member;
an auto-exposure-mode selecting mode, corresponding to a first position of the at least four positions of the manual operation member, in which an appropriate photographic mode is automatically selected from the different photographic modes based on photographic conditions, the controller allowing the built-in flash to discharge automatically in the selected appropriate photographic mode at a time of exposure, when indicated by the photographic conditions; and
a flash-prohibiting/auto-exposure-mode selecting mode, corresponding to a second position of the at least four positions of the manual operation member, in which an appropriate photographic mode is automatically selected from the different photographic modes based on the photographic conditions, the controller prohibiting the built-in flash from discharging automatically in the selected appropriate photographic mode at the time of exposure, regardless of the photographic conditions;
wherein the controller selects the auto-exposure-mode selecting mode when the manual operation member is positioned at the first position, the flash-prohibiting/auto-exposure-mode selecting mode when the manual operation member is positioned at the second position, and one of the at least two exposure modes when the manual operation member is positioned at the corresponding exposure mode positions.

15. The camera according to claim 14, further comprising:
a plurality of indicating devices corresponding to the at least four positions of the manual operation member, each of the plurality of indicating devices illuminating in response to the manual operation member being positioned at the corresponding one of the at least four positions;
wherein, when the manual operation member is positioned at one of the auto-exposure-mode position and the flash-prohibiting/auto-exposure mode position, the indicating device corresponding to the automatically selected appropriate photographic mode illuminates.

16. The camera according to claim 15, the exposure mode positions of the manual operation member being situated between the first position and the second position of the manual operation member.

17. A controller for controlling a camera, comprising:
different photographic modes, comprising at least two exposure modes corresponding to exposure mode positions of a manual operation member configured to be moved manually among at least four positions;
an auto-exposure-mode selecting mode, corresponding to a first position of the at least four positions of the manual operation member, in which an appropriate photographic mode is automatically selected from the different photographic modes based on photographic conditions, the controller allowing a flash light emitter to discharge automatically in the selected appropriate photographic mode when the flash light emitter is controlled to discharge at a time of exposure; and a flash-prohibiting/auto-exposure-mode selecting mode, corresponding to a second position of the at least four positions of the manual operation member, in which an appropriate photographic mode is automatically selected from the different photographic modes based on the photographic conditions, the controller preventing the flash light emitter from discharging automatically in the selected appropriate photographic mode at a time of exposure;

wherein, in response to an operation of the manual operation member, the controller selects the auto-exposure-mode selecting mode when the manual operation member is positioned at the first position, the flash-prohibiting/auto-exposure-mode selecting mode when the manual operation member is positioned at the second position, and one of the at least two exposure modes when the manual operation member is positioned at the corresponding one of the at least two exposure mode positions.

18. The camera according to claim 17, further comprising:

a plurality of indicating devices corresponding to the at least four positions of the manual operation member, each of the plurality of indicating devices illuminating in response to the manual operation member being positioned at the corresponding one of the at least four positions;

wherein, when the manual operation member is positioned at one of the auto-exposure-mode position and the flash-prohibiting/auto-exposure mode position, the indicating device corresponding to the automatically selected appropriate photographic mode illuminates.

19. The camera according to claim 18, the exposure mode positions of the manual operation member being situated between the first position and the second position of the manual operation member.

20. A controller for controlling a camera having a manual operation member and an external connector, to which an external flash unit can be connected, the controller comprising:

different photographic modes, comprising at least two exposure modes corresponding to exposure mode positions of the manual operation member, the manual operation member being configured to be moved manually among at least four positions; and a flash-prohibiting/auto-exposure-mode selecting mode, corresponding to a first position of the at least four positions of the manual operation member, in which an appropriate photographic mode is automatically selected from the different photographic modes based on photographic conditions, the controller prohibiting the external flash from discharging automatically in the selected appropriate photographic mode at a time of exposure when the external flash unit is connected to the external connector.

21. The controller according to claim 20, further comprising:

a plurality of indicating devices corresponding to the at least four positions of the manual operation member, each of the plurality of indicating devices illuminating in response to the manual operation member being positioned at the corresponding one of the at least four positions;

wherein, when the manual operation member is positioned at the flash-prohibiting/auto-exposure mode position, the indicating device corresponding to the automatically selected appropriate photographic mode illuminates.

22. The controller according to claim 21, the exposure mode positions of the manual operation member being situated between the first position and a second position of the manual operation member, the second position corresponding to an auto-exposure-mode selecting mode.

23. A camera having a built-in flash, comprising:

at least two different programmed auto-exposure (AE) modes corresponding to exposure mode positions of at least four positions of a manual operation member;

an auto-exposure-mode selecting mode, corresponding to a first position of the at least four positions of the manual operation member, in which an appropriate programmed AE mode is automatically selected from the different programmed AE modes based on a photographic condition, the built-in flash being allowed to discharge automatically in the selected appropriate programmed AE mode when the built-in flash discharges at a time of exposure; and a flash-prohibiting/auto-exposure-mode selecting mode, corresponding to a second position of the at least four positions of the manual operation member, in which an appropriate programmed AE mode is automatically selected from the different programmed AE modes based on a photographic condition, the built-in flash being prohibited from discharging automatically in the selected appropriate programmed AE mode at a time of exposure;

wherein the auto-exposure-mode selecting mode is activated when the manual operation member is positioned at the first position, the flash-prohibiting/auto-exposure-mode selecting mode is activated when the manual operation member is positioned at the second position, and one of the at least two programmed AE modes is activated when the manual operation member is positioned at the corresponding exposure mode position.

24. The camera according to claim 23, further comprising:

a plurality of indicating devices corresponding to the at least four positions of the manual operation member, each of the plurality of indicating devices illuminating in response to the manual operation member being positioned at the corresponding one of the at least four positions;

wherein, when the manual operation member is positioned at one of the auto-exposure-mode selecting mode position and the flash-prohibiting/auto-exposure-mode selecting mode position, the indicating device corresponding to the automatically selected appropriate programmed AE mode illuminates.

25. The camera according to claim 24, the exposure mode positions of the manual operation member being situated between the first position and the second position of the manual operation member.

* * * * *